(12) United States Patent
Fei et al.

(10) Patent No.: US 12,393,491 B2
(45) Date of Patent: Aug. 19, 2025

(54) DATA ACCESS METHOD AND SYSTEM, DEVICE, AND STORAGE MEDIUM

(71) Applicant: Cloud Intelligence Assets Holding (Singapore) Private Limited, Singapore (SG)

(72) Inventors: Gongjun Fei, Beijing (CN); Hailin Peng, Beijing (CN)

(73) Assignee: Cloud Intelligence Assets Holding (Singapore) Private Limited, Singapore (SG)

( * ) Notice: Subject to any disclaimer, the term of this patent is extended or adjusted under 35 U.S.C. 154(b) by 0 days.

(21) Appl. No.: 18/842,657

(22) PCT Filed: Feb. 24, 2023

(86) PCT No.: PCT/CN2023/078265
§ 371 (c)(1),
(2) Date: Aug. 29, 2024

(87) PCT Pub. No.: WO2023/169235
PCT Pub. Date: Sep. 14, 2023

(65) Prior Publication Data
US 2025/0173228 A1    May 29, 2025

(30) Foreign Application Priority Data
Mar. 7, 2022  (CN) .......................... 202210217619.2

(51) Int. Cl.
*G06F 11/14*    (2006.01)

(52) U.S. Cl.
CPC .............................. *G06F 11/1461* (2013.01)

(58) Field of Classification Search
None
See application file for complete search history.

(56) References Cited

FOREIGN PATENT DOCUMENTS

CN    114281791 A    4/2022

*Primary Examiner* — Eddy Cheung
(74) *Attorney, Agent, or Firm* — Volpe Koenig

(57) ABSTRACT

A data access method, system, device and storage medium are disclosed. In a case where there are data access hotspots in the original snapshot copy, multiple storage nodes are scheduled to concurrently read a data file of the original snapshot copy into memories of the multiple storage nodes, which can improve the efficiency of the storage nodes in reading the data file of the original snapshot copy. Based on data files in the memories of the multiple storage nodes, data to be accessed is provided to the instance, and memory caches of the multiple storage nodes may be used to accelerate the reading speed of the data to be accessed and reduce the data access delay. The multiple storage nodes are scheduled to dynamically generate a new snapshot copy based on the data files in the memories for a cloud disk to reference.

20 Claims, 11 Drawing Sheets

DATA ACCESS METHOD AND SYSTEM, DEVICE, AND STORAGE MEDIUM

CROSS-REFERENCE TO RELATED APPLICATION

The present application claims priority to the Chinese patent application No. 202210217619.2 filed with the China Patent Office on Mar. 7, 2022, entitled "DATA ACCESS METHOD AND SYSTEM, DEVICE, AND STORAGE MEDIUM", which is incorporated by reference in the present application in its entirety.

TECHNICAL FIELD

The present application relates to the field of cloud computing technology, and in particular to a data access method and system, a device and a storage medium.

BACKGROUND

Elastic computing is an important part of cloud computing. For example, in today's Internet applications, business traffic fluctuates violently. When these applications run on a cloud computing platform, the number of virtual machines (VMs) required has a very large elastic fluctuation. For example, when a business peak arrives, a large number of VMs need to be started in a short period of time.

To start a large number of VMs in a short period of time, it is necessary to create a large number of cloud disks concurrently. Snapshot data copies may clone a large number of cloud disks in batch via a manner of clone links, so that a single snapshot copy of a local cluster can quickly complete the creation of a large number of cloud disks without any data transfer.

However, due to a single local snapshot data copy, as a data source, being used for a large number of virtual machine instances to concurrently start up, it creates a hotspot issue for reading data from the single snapshot copy. This, in turn, leads to increased latency in reading the snapshot copy data.

SUMMARY

Aspects of the present application provide a data access method and system, a device and a storage medium, which are used to reduce the probability of appearing data access hotspots, contributing to a reduction in data access latency Embodiments of the present application provides a data access method, including:
  obtaining a data request initiated by an instance for accessing a cloud disk loaded to the instance; obtaining a snapshot identifier of data to be accessed from the data request;
  in a case where there is a data access hotspot in an original snapshot copy corresponding to the snapshot identifier, scheduling multiple storage nodes to concurrently read a data file of the original snapshot copy into memories of the multiple storage nodes;
  providing the data to be accessed to the instance based on data files in the memories of the multiple storage nodes;
  scheduling the multiple storage nodes to generate a new snapshot copy corresponding to the snapshot identifier based on the data files in the memories; and
  importing a physical file of the new snapshot copy into the cloud disk for the instance to access the new snapshot copy.

The embodiments of the present application further provide a distributed storage system, including: a virtualized service node, a management and control node, a block service node and a storage node; wherein
  the virtualized service node is deployed with an instance;
    the block service node is provided with a cloud disk;
    the storage node stores a snapshot copy required for the instance to start up;
  the cloud disk in the storage node is loaded to the instance;
  during startup, the instance sends a data request to the cloud disk;
  the management and control node is configured to: obtain the data request; obtain a snapshot identifier of data to be accessed from the data request; in a case where there is a data access hotspot in an original snapshot copy corresponding to the snapshot identifier, schedule multiple storage nodes to concurrently read a data file of the original snapshot copy into memories of the multiple storage nodes; the instance reads the data to be accessed from the memories of the multiple storage nodes;
  the management and control node is further configured to schedule the multiple storage nodes to generate a new snapshot copy corresponding to the snapshot identifier based on the data files in the memories, for the instance to access the new snapshot copy.

The embodiments of the present application further provide a computing device, including:
  a memory, a processor and a communication component; wherein the memory is configured to store a computer program;
  the processor is coupled to the memory and the communication component, and configured to execute the computer program to perform steps in the data access method.

The embodiments of the present application further provide a computer-readable storage medium having computer instructions stored thereon, which, when executed by one or more processors, cause the one or more processors to perform steps in the above data access method.

In the embodiments of the present application, in a case where there are data access hotspots in the original snapshot copy, multiple storage nodes may be scheduled to concurrently read a data file of the original snapshot copy into memories of the multiple storage nodes, which can improve the efficiency of the storage nodes in reading the data file of the original snapshot copy. Based on the data files in the memories of the multiple storage nodes, the data to be accessed is provided to the instance, and memory caches of multiple storage nodes may be used to accelerate the reading speed of the data to be accessed and reduce the data access delay. On the other hand, the multiple storage nodes are scheduled to dynamically generate a new snapshot copy based on the data files in the memories for a cloud disk to reference. In this way, in a case where an instance is started, a new snapshot copy may be accessed, and the access traffic to the data to be accessed may be dispersed to different snapshot copies, which can reduce the probability of appearing data access hotspots and even eliminate data access hotspots, thereby helping to speed up data access efficiency and reduce data access latency.

BRIEF DESCRIPTION OF THE DRAWINGS

The drawings described herein are used to provide further understanding of the present application and constitute a part of the present application. The illustrative embodiments of the present application and their descriptions are used to explain the present application and do not constitute improper limitations on the present application. In the drawings.

DETAILED DESCRIPTION

Figure 1:
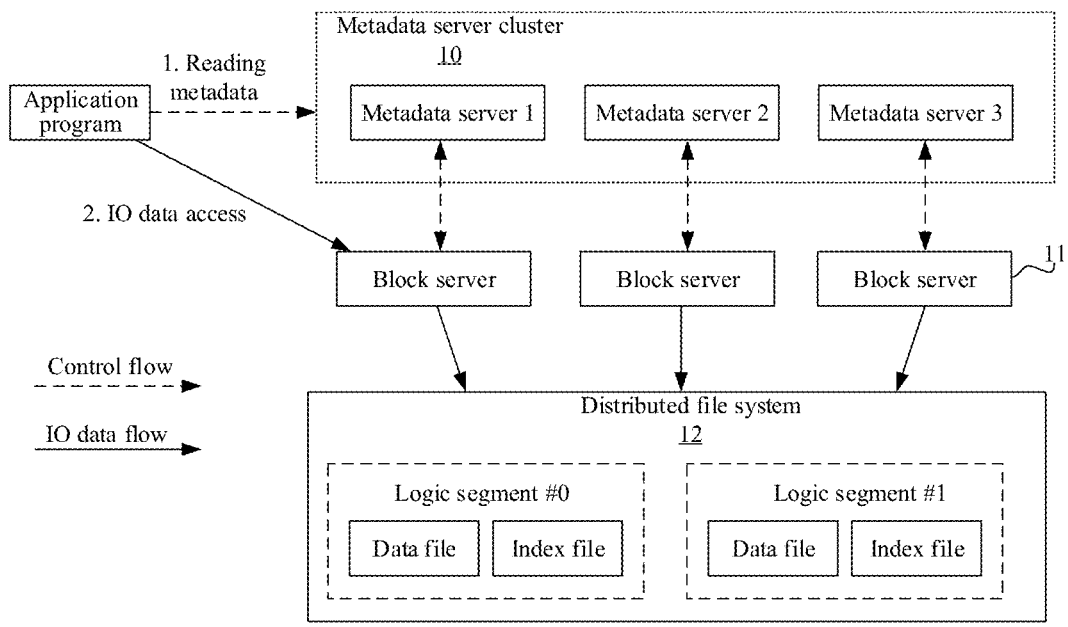
FIG. 1 is a schematic structural diagram of a distributed storage system provided in an embodiment of the present application.

In order to make the objectives, technical solutions and advantages of the present application clearer, the technical solutions of the present application will be clearly and completely described below in conjunction with specific embodiments of the present application and corresponding drawings. Obviously, the described embodiments are only part of embodiments of the present application, rather than all the embodiments. Based on the embodiments in the present application, all other embodiments obtained by a person having ordinary skill in the art without making any inventive effort shall fall within the scope of protection of the present application.

In view of the existing technical problem of the data reading hotspot of a single snapshot copy, in some embodiments of the present application, in a case where there are data access hotspots in the original snapshot copy, multiple storage nodes are scheduled to concurrently read data files of the original snapshot copy into memories of the multiple storage nodes, which can improve the efficiency of the storage nodes in reading the data files of the original snapshot copy. Based on the data files in the memories of the multiple storage nodes, the data to be accessed is provided to the instance, and memory caches of the multiple storage nodes may be used to accelerate the reading speed of the data to be accessed and reduce the data access delay. The multiple storage nodes are scheduled to dynamically generate a new snapshot copy based on the data files in the memories for a cloud disk to reference. In a case where an instance is started, the new snapshot copy may be accessed, and the access traffic to the data to be accessed may be dispersed to different snapshot copies, which can reduce the probability of appearing data access hotspots and even eliminate data access hotspots, thereby contributing to speed up data access efficiency and reduce data access latency.

The technical solutions provided by various embodiments of the present application are described in detail below in conjunction with the accompanying drawings.

It should be noted that the same reference numeral denotes the same object in the following drawings and embodiments, and therefore, once an object is defined in one drawing or embodiment, it does not need to be further discussed in the subsequent drawings and embodiments.

FIG. 1 is a schematic diagram of the logical architecture of a distributed storage system provided in an embodiment of the present application. As shown in FIG. 1, the distributed storage system includes: a metadata service cluster 10, a block server 11 and a distributed file system 12. The distributed storage system is a distributed log structured block device (LSBD). The writing of LSBD data is appended, and the reference to data written to the block device does not need to update the reference address of the logical block to the disk every time. Instead, the indexes of the read data blocks are accumulated in the memory to a certain extent, and then the latest index of the partially updated data block in the memory is asynchronously updated and merged with the index of the full amount that has been stored, so as to achieve efficient data reading.

In the present embodiment, the block server 11 is deployed with multiple cloud disks. 'Multiple' means 2 or more than 2. In actual applications, tens of thousands of cloud disks are deployed on the block server 11. Application programs may read from and write to cloud disks.

Logical segments in the distributed file system 12 are physical files of the logical segments. The physical files of a logical segment may include: an index file (Index File), a data file (Data File) and a log file (Txn File), etc. These files may be written in an append manner. The Index File is used to record a correspondence between logical address space (Logical Block Address Range, LBA Range) of the cloud disk and physical address space of the data files. The data file is responsible for storing data of the logical segment, and the log file (Txn File) records a transaction log of modifying the logical segment. The application program may access a corresponding logical segment (Device Segment) in the distributed file system 12 through the block server 11 to achieve access to the cloud disk.

In the embodiments of the present application, the specific storage form of the physical files of the logical segment is not limited. In some embodiments, the physical files of the logical segment may be stored in erasure codes, which helps improve the data fault tolerance of the distributed storage system and can recover faulty data in a case where a certain degree of data loss or damage occurs.

Figure 2:
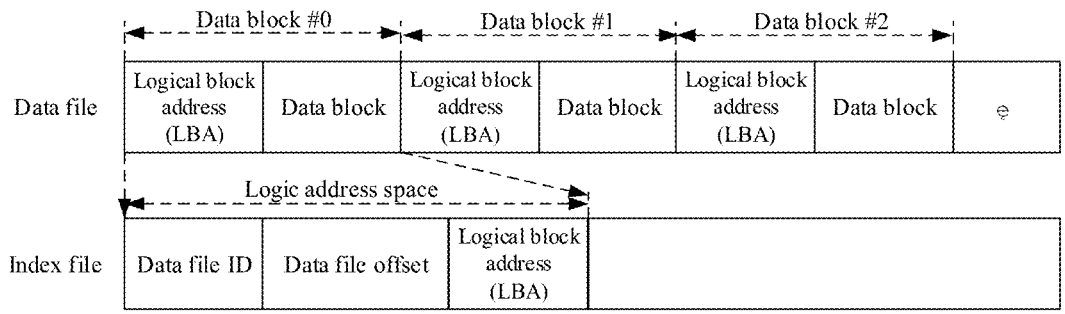
FIG. 2 is a schematic diagram of the storage format of a physical file of a logical segment provided in an embodiment of the present application.

FIG. 2 shows the storage format of a physical file of a logical segment. As shown in FIG. 2, an application program writes a data file in an append manner. The offset of the file is incremented all the time and cannot be overwritten. The index file represents the logical address space of the entire logical segment. It is loaded into the memory when the logical segment is loaded, and provides the application program with the conversion of a logical address of a data block to a physical address of the data block, including a data file corresponding to a logical block address and an offset address of the data file, that is, data file offset. The playback operation is realized through the index file. The playback operation is to access a corresponding data file according to the address provided by the index file.

Figure 3:
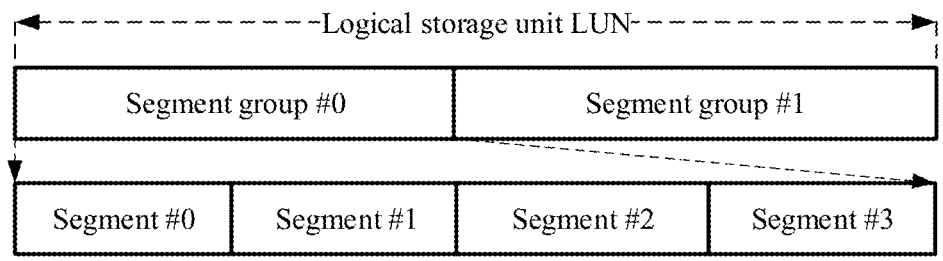
FIG. 3 is a schematic diagram of the logical relationship of a storage logic unit provided in an embodiment of the present application.

For logical segments in the distributed file system 12, as shown in FIG. 3, a plurality of logical segments constitute a segment group, and a plurality of segment groups constitute a logical storage unit (Logical Unit Number, LUN). The metadata server cluster 10 may store relationships between logical storage units, logical segment groups, and logical segments. The cloud data server may also store metadata of a logical segment (Device Segment), such as the size of the logical segment and other configuration information.

Each block server 11 may obtain, in a corresponding metadata server, metadata of a corresponding logical segment and a logical segment accessible to each block server 11. The logical segment accessible to each block server 11 may be one or more logical segments.

Figure 4:
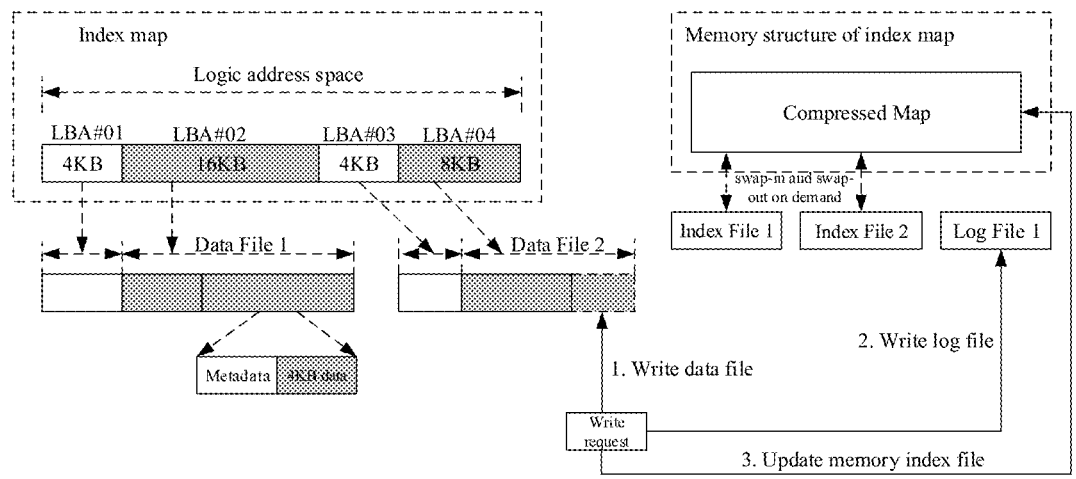
FIG. 4 is a schematic diagram of a data writing process of a logic segment provided in an embodiment of the present application.

A data writing process of a logical segment is exemplarily described below with reference to FIG. 4. As shown in FIG. 4, for a write request initiated by an application program, application data carried by the write request may be written into a data file in the form of a data block. Transaction Log of writing the data block is recorded in a log file (Txn File). Furthermore, the correspondence between the logical address space (LBA Range) and the physical address range of the newly written data block may be updated in an index file. When the data block is read, the index file may be loaded into a memory, that is, loaded into a compressed map table in the memory in FIG. 4. The index file in the memory provides the conversion from a logical address of a data block to a physical address of the data block. The index file in the memory may be swapped in and out according to data reading requirements.

In the field of cloud computing, applications run on cloud computing platforms, and the demand for instances fluctuates elastically. For example, during business peak periods, a large number of instances need to be started in a short period of time. In the embodiments of the present application, an instance refers to an object equivalent to a virtual server that may provide basic components such as a CPU, a memory, a network configuration, a disk, etc. Its specific performance indicators include the number of instance vCPU cores, memory size, network performance, etc. In the present embodiments, the specific implementation form of an instance is not limited. Optionally, an instance may be implemented as a virtual machine, a container, a container group, etc. Here, the container group may be implemented in the form of pod.

Figure 5:
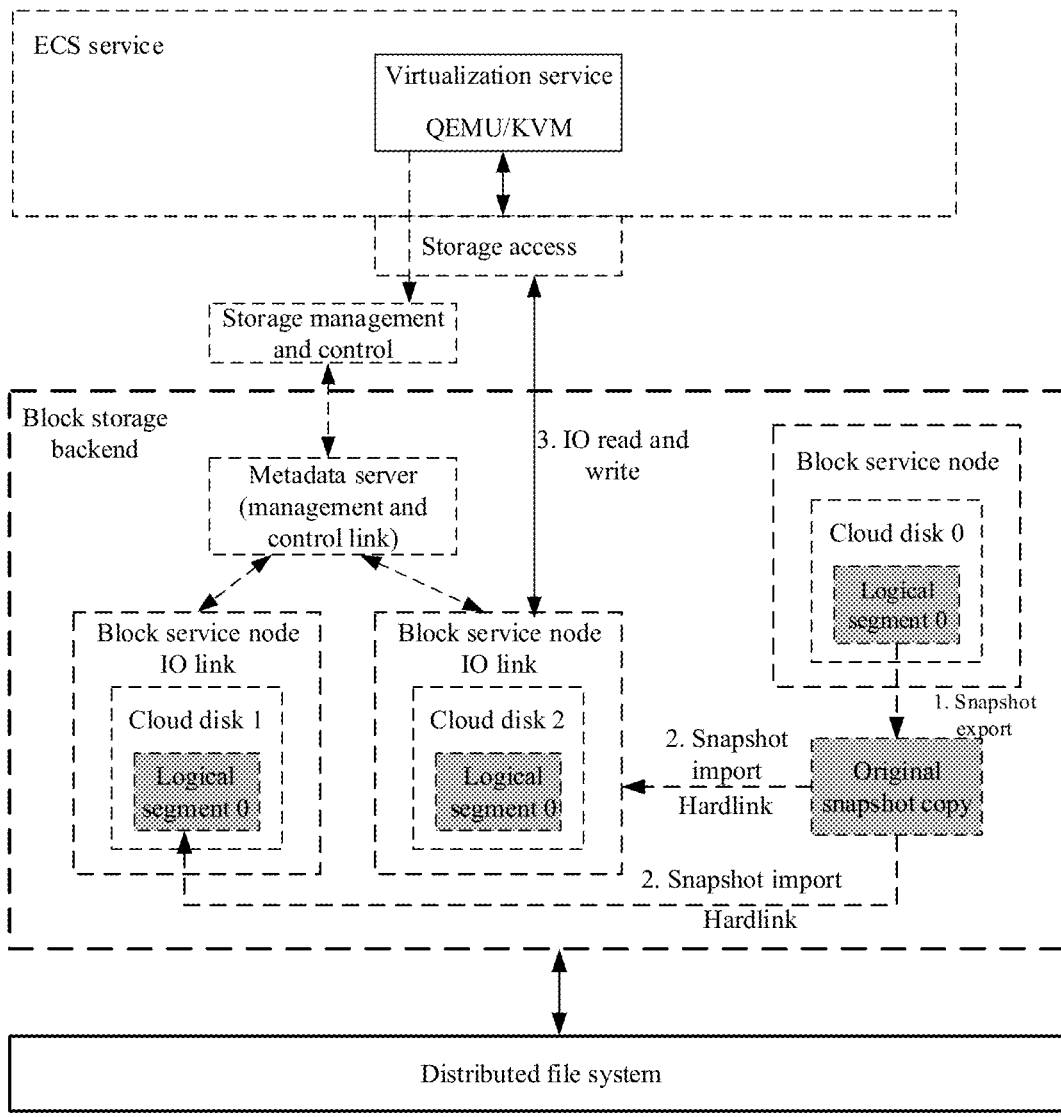
FIG. 5 is a schematic diagram of a cloud disk cloning process provided in an embodiment of the present application.

To start a large number of instances in a short period of time, it is necessary to create a large number of cloud disks concurrently. In FIG. 5, Elastic Cloud Service (ECS) may provide virtualization services to provide users with virtual instances required for running application programs. FIG. 5 only illustrates a QEMU type virtual machine or a KVM type virtual machine as an example, but does not constitute a limitation. Block storage backend refers to the implementation of backend processing logic of the elastic cloud service. This block storage backend may be used for cloning cloud disks, storing snapshot copy data, and so on. In FIG. 5, the block storage backend may include: a cloud data server, a block service node, and a storage node deploying a distributed file system, etc. The block service node may deploy at least one cloud disk and load it on a virtual machine, that is, the storage is connected to a virtual machine as shown in FIG. 5. As shown in FIG. 5, the virtual machine may also perform storage management and control on the block service node through a metadata server.

FIG. 5 shows the main process of cloning a cloud disk with a local snapshot copy. As shown in FIG. 5, after a local snapshot is created, the local snapshot that shares data with the cloud disk is exported to a local cluster storage outside the cloud disk via the method of hard link to obtain an original snapshot copy (corresponding to step 1 in FIG. 5). In a case where the local snapshot is used to create cloud disks in batches, data of the newly cloned batches of cloud disks is directly created and referenced using the local snapshot copy. As shown in FIG. 5, the data of the original snapshot copy may be imported into the newly cloned cloud disks via the method of hard link, so that the newly cloned batches of cloud disks may reference the data of the original snapshot copy (corresponding to step 2 in FIG. 5), thereby realizing that the batches of cloud disks share a data file of a single snapshot copy (the original snapshot copy). After data of the snapshot copy is imported to the newly cloned cloud disks, the cloud disk cloning operation is completed. An instance may read data from the newly cloned cloud disks (corresponding to step 3 in FIG. 5) to start the instance.

Figure 6:
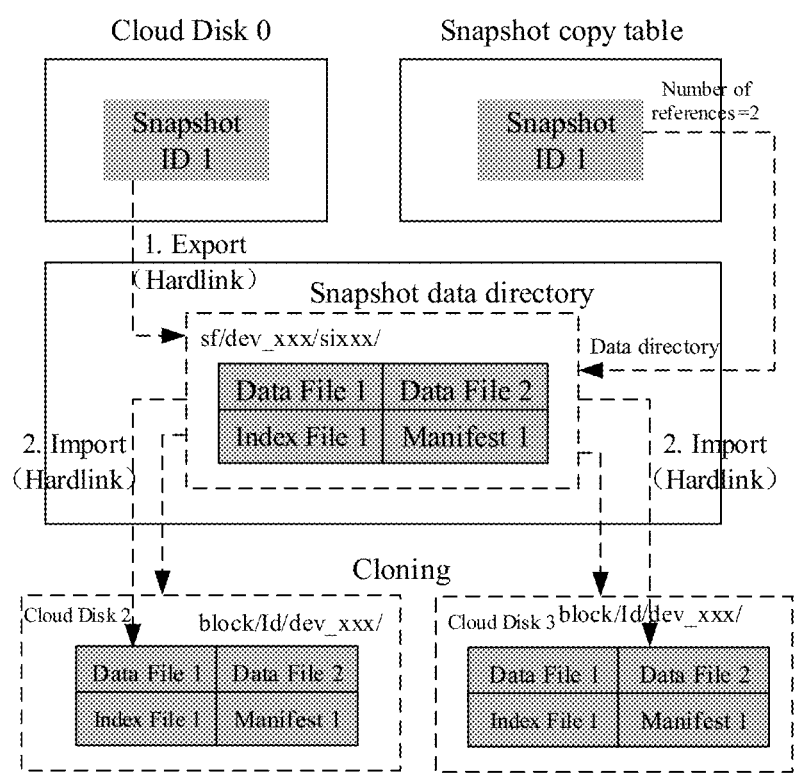
FIG. 6 is a schematic diagram of the storage format of a snapshot copy provided in an embodiment of the present application.

The storage format of local snapshot data in the distributed file system is shown in FIG. 6. As shown in FIG. 6, after the local snapshot data is created, a data file associated with the snapshot is independently exported via the method of hard link and stored at an independent snapshot copy data directory sf/dev_xxx/sixxx/(corresponding to step 1 in FIG. 6). At the same time, the associated references and records of the snapshot are stored in a snapshot copy table. For example, the number of references to a snapshot copy corresponding to snapshot ID1 is stored in the snapshot copy table in FIG. 6.

The cloud disk cloning process directly uses the import method of hard link, that is, a physical file of the original snapshot copy is imported into the newly cloned cloud disks via hard link, maintaining the reference to the data file by the newly cloned cloud disks (corresponding to step 2 in FIG. 6). The number of data files in a snapshot copy may be 1 or multiple. FIG. 6 only exemplarily illustrates two data files of the snapshot copy, but it is not limited thereto. The snapshot data directory may also record manifest of the snapshot copy. The manifest is used to record metadata information of the snapshot copy, etc.

The snapshot data directory also stores an index file of the snapshot copy. The index file records a correspondence between logical addresses and physical addresses of the data files. As shown in FIG. 6, there are two cloud disks that use the local snapshot copy for fast cloning, so the number of references to the snapshot ID corresponding to this snapshot copy in the snapshot copy table is 2.

From the reference relationship of physical data in FIG. 6, it can be seen that the snapshot copy and the corresponding data block are actually shared by multiple cloud disks via the method of hard link. As the amount of data in the batches of cloned cloud disks increases, references to the data file of a single snapshot copy will also increase, and the reference count of the snapshot copy in the snapshot copy table will also increase, ultimately achieving support of the single local snapshot copy to batch cloning of multiple cloud disks.

From the above local snapshot cloning process, it can be seen that the existing snapshot cloning method is completed by sharing a data file of a single snapshot copy, and the cloning processes of multiple cloud disks actually share the physical file of the same snapshot copy. In a distributed file system, access to a data file of a snapshot copy accomplishes data reading by reading a data block corresponding to a logical address of the data file.

Figure 7:
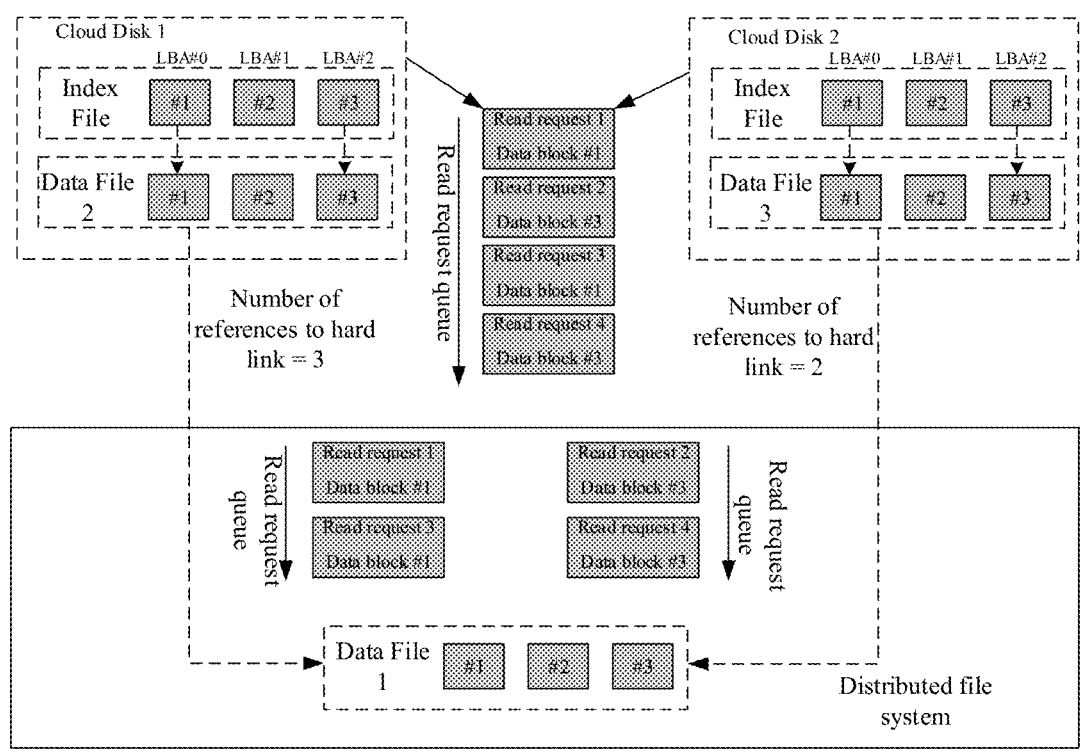
FIG. 7 is a schematic diagram of referencing a single snapshot copy to clone cloud disks in batch provided in an embodiment of the present application.

As shown in FIG. 7, Data File1, Data File2 and Data File3 actually share the same data blocks in the distributed file system. Data File2 and Data File3 of cloud disks Device1 and Device2 actually share the data blocks (i.e., data blocks #1, data blocks #2 and data blocks #3) of Data File1 in the distributed file system by increasing the number of references to the hard link.

In FIG. 7, since multiple cloud disks cloned in batches share the same data files, and multiple instances started in batches are more likely to adopt the same data access mode, data requests from multiple instances are quite easily scheduled to the same block server, causing data requests for the data files to be in a waiting state in a read request queue of the block server. For example, as shown in FIG. 7, read requests for data block #1 and data block #3 are queued for access. As the number of cloud disks sharing the same data file increases, the queue depth of data requests increases, causing the latency of single-point data access to increase, and thus causing a hotspot problem for data access.

In order to solve the data hotspot problem caused by cloning cloud disks in batch using a single snapshot copy and reduce the data access delay caused by data sharing, a data access method for dynamically deriving snapshot copies is provided in the embodiments of the present application. The data access method provided in the embodiments of the present application is exemplarily described below in combination with specific embodiments.

Figure 8A:
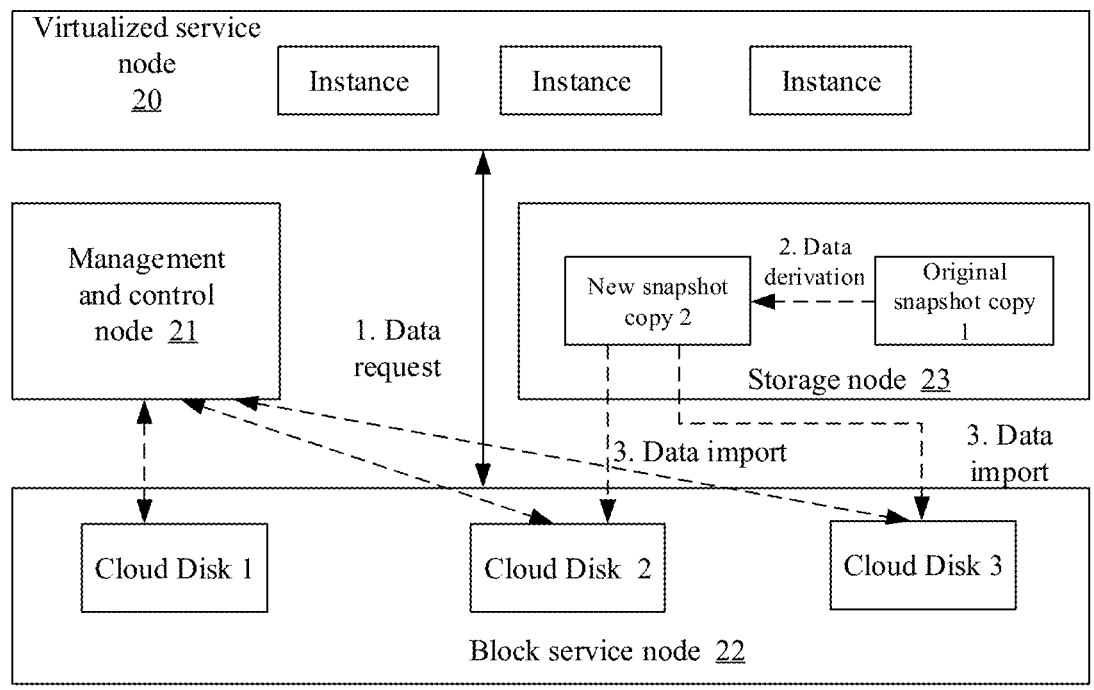
FIG. 8a is a schematic structural diagram of another distributed storage system provided in an embodiment of the present application.

FIG. 8a is a schematic structural diagram of another distributed storage system provided in an embodiment of the present application. As shown in FIG. 8a, this distributed storage system includes: a virtualized service node 20, a management and control node 21, a block service node 22 and a storage node 23.

The virtualized service node 20 may provide elastic cloud services and dynamically create or reduce instances according to actual application requirements. In the present embodiment, the virtualized service node 20 is deployed with an instance, such as a virtual machine, a container, or a container group. The process of creating an instance may refer to the relevant content of the above embodiments, which will not be repeated here. The virtualized service node 20 may be implemented as a computing node in an elastic cloud service, etc.

In the embodiments of the present application, the management and control node 21, the block service node 22 and the storage node 23 together constitute block storage backend of the elastic cloud service. The storage node 23 stores a snapshot copy required for the instance to start up. The original snapshot copy stored in the storage node 23 may be downloaded from the mirror center to the storage node 23 in advance for storage, so as to obtain a local snapshot copy.

Starting a large number of instances requires the concurrent creation of a large number of cloud disks. The block service node 22 may be provided with cloud disks, for example, cloud disks 1-3 in FIG. 8a. After the cloud disks are created, they may be loaded to the instances. The instances may access data on the cloud disks to obtain snapshot copies required for the instance to start up. In the embodiments of the present application, the block service node 22 and the storage node 23 may be implemented as physical machines of the same type, or as physical machines of different types, and so on. The block service node 22 and the storage node 23 may also be implemented as the same physical machine. That is, the physical machine may be provided with cloud disks and may also be used as a storage node to store snapshot copies.

The above cloud disk cloning process may be divided into: a cloud disk creation process and a snapshot data import process. For a newly created cloud disk, even if the import of snapshot copy data has not been completed, it has already been loaded to the instance, allowing the instance to access the cloud disk at this point. Accordingly, during the startup process of the instance, a data request may be initiated to the cloud disk loaded to the instance.

For data to be accessed required by the data request, the management and control node 21 may schedule the block service node 22 to load the data by using a delayed loading method, and provide the loaded data to the instance for the instance to start. Delayed loading may also be called lazy loading, which can achieve on-demand loading. Delayed loading mainly means that data loading operations are performed only when the data is really needed. It can be used to avoid some unnecessary performance overhead, save memory resources, and increase data loading speed.

Figure 8B:
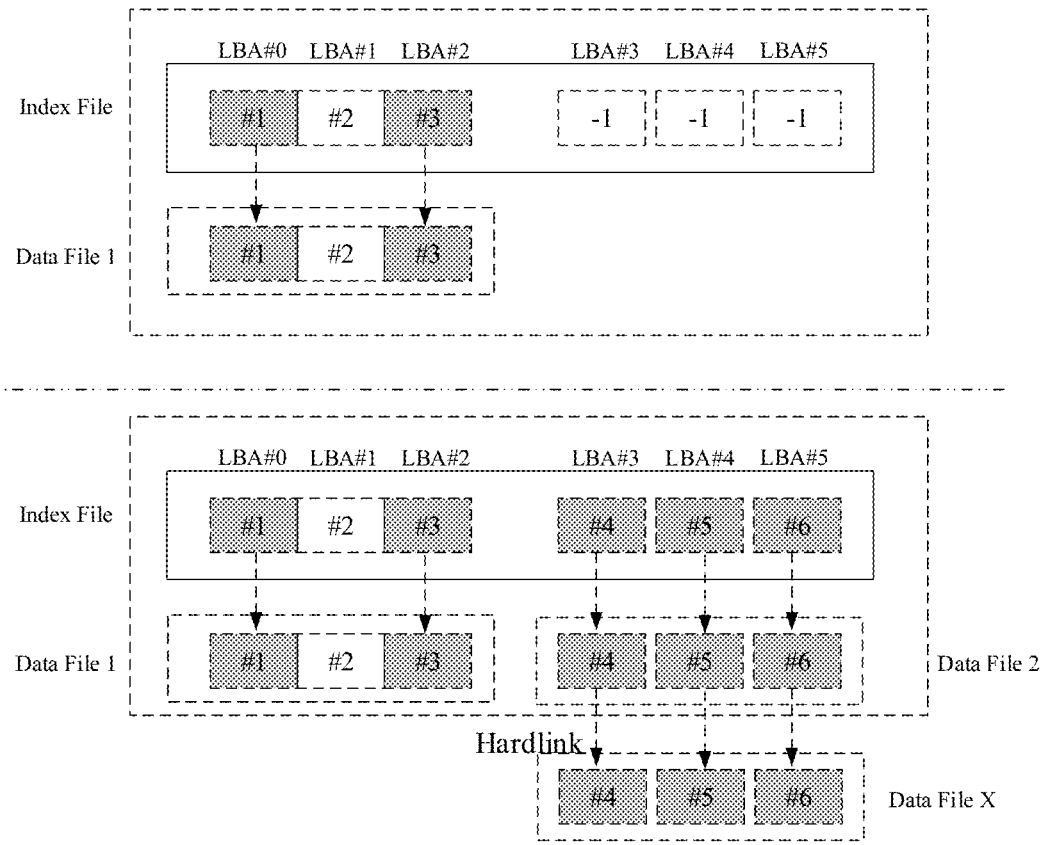
FIG. 8b is a schematic diagram illustrating logic reference of data of multiple snapshot copies provided in an embodiment of the present application.

Since the snapshot copy data has not yet imported into the cloud disk, the management and control node 21 needs to import the snapshot copy data into the cloud disk. In the embodiments of the present application, the delayed loading method may be adopted for the snapshot copy data, that is, the snapshot copy data is imported into the cloud disk only when the instance accesses the snapshot copy data. As shown in FIG. 8b, before the snapshot copy data is imported into the cloud disk, a logical block address (LBA) in an index file of the cloud disk which points to the snapshot copy data may be marked as a designated identifier. The specified identifier may be −1, etc. For example, in FIG. 8b, logical block addresses LBA #3, LBA #4 and LBA #5 are marked as −1 to identify delayed loaded logical blocks.

Furthermore, after the snapshot copy data is imported into the cloud disk, the logical block address pointing to the snapshot copy data in the index file of the cloud disk is modified to the physical address of the data file of the snapshot copy, thereby realizing the reference to the data file of the snapshot copy by the cloud disk. In FIG. 8b, logical block addresses LBA #3, LBA #4 and LBA #5 refer to logical block addresses in the index file of the cloud disk which point to the data file of the snapshot copy required by the cloud disk to start.

In the embodiments of the present application, in order to solve the data access hotspot problem caused by accessing a single snapshot copy in the above embodiments, the management and control node 21 may obtain a data request sent by an instance to a cloud disk; and obtain a snapshot identifier corresponding to data to be accessed from the data request. The snapshot identifier refers to information that can uniquely represent one snapshot copy. For example, the snapshot identifier may be a snapshot ID, a snapshot number, or the like.

The management and control node 21 may obtain a snapshot copy corresponding to the snapshot identifier from snapshot copies stored in the storage node 23. This snapshot copy may be defined as the original snapshot copy. The number of original snapshot copies may be 1 or multiple. 'Multiple' means 2 or more than 2. In the embodiments of the present application, in order to solve the data access hotspot problem caused by accessing the same snapshot copy to clone a large number of cloud disks, the management and control node 21 may first determine the data access hotspot situation of the original snapshot copy; and determine whether to dynamically derive a new snapshot copy based on the data hotspot situation of the original snapshot copy. In the embodiments of the present application, the specific implementation of the management and control node 21 determining the data access hotspot of the original snapshot copy is not limited. Several optional implementations are described below as examples.

Implementation 1: In some embodiments, the management and control node 21 may obtain the number of references to the original snapshot copy. Reference data of the original snapshot copy refers to the number of cloud disks that share a physical file of the original snapshot copy. The more the number of references to the original snapshot copy, the more concurrent access to the original snapshot copy at the same time, which increases the possibility of causing data access hotspots. Therefore, a threshold number of references to the snapshot copy may be set. Accordingly, it may be determined whether the number of references to the original snapshot copy is greater than or equal to the threshold number of references. If the determination result is that the number of references to the original snapshot copy is greater than or equal to the threshold number of references, it is determined that there are data access hotspots in the original snapshot copy. In the embodiments of the present application, the specific value of the threshold number of references is not limited. In some embodiments, the threshold number of references may be set based on prior knowledge. In other embodiments, the threshold number of references may be determined through stress testing, etc.

Implementation 2: In the field of cloud computing, performance of a cloud disk may be monitored. The performance of a cloud disk includes: data reading time delay of the cloud disk. The data reading time delay of the cloud disk may be determined by time difference between the time when a data request to the cloud disk is received and the time when data required for the data request is read from the cloud disk. The longer the data reading time delay of the cloud disk, the more serious the data hotspot problem of the cloud disk is. Accordingly, the management and control node 21 may obtain the data reading time delay of a cloud disk that references the original snapshot copy; and determine whether the data reading time delay is greater than or equal to the set time delay threshold; if the determination result is yes, it is determined that a data access hotspot problem exists in the original snapshot copy.

The above embodiments 1 and 2 are merely exemplary and do not constitute limitations. The above embodiments 1 and 2 may be implemented either one or in combination. In a case where implementations 1 and 2 are implemented in combination, it may be determined that there is a data access hotspot problem in the original snapshot copy in a case where the number of references to the original snapshot copy is greater than or equal to the threshold number of references, and the data reading time delay of the cloud disk that references the original snapshot copy is greater than or equal to the set time delay threshold. Of course, if the determination result is yes, it may also be determined that there is a data access hotspot problem in the original snapshot copy; and so on.

In the embodiments of the present application, in a case where there are no data access hotspots in the original snapshot copy, the management and control node 21 may import the data of the original snapshot copy into the cloud disk accessed by the instance, so that the cloud disk can share the original snapshot copy with other cloud disks. Accordingly, the management and control node 21 may modify a target logical block address in the index file of the cloud disk which points to a data file of the original snapshot copy to the physical address of the data file of the original snapshot copy.

Afterwards, the instance may read data to be accessed from data of the original snapshot copy corresponding to the cloud disk; and start the instance using the data to be accessed. Since the data of the original snapshot copy is distributedly stored in the storage node 23, the storage node 23 may read the data to be accessed from the data of the original snapshot copy through delayed loading (or lazy load) mode; and provide the data to be accessed to the instance. The instance may be started with the data to be accessed.

Accordingly, in a case where there are data access hotspots in the original snapshot copy, the management and control node 21 may schedule at least one storage node 23 to read the data file of the original snapshot copy into the memory of the at least one storage node 23. The number of storage nodes scheduled by the management and control node 21 may be 1 or multiple. 'Multiple' means 2 or more than 2. In order to improve data reading efficiency, the management and control node 21 may schedule multiple storage nodes 23 to concurrently read the data file of the original snapshot copy into memories of the multiple storage nodes 23.

The storage node that the management and control node 21 schedules to perform the data conversion task may include: a storage node that stores the original snapshot copy, and of course, may not include the storage node that stores the original snapshot copy.

Optionally, based on task load conditions of the storage nodes 23 in the distributed storage system, the management and control node 21 may select at least one storage node whose task load rate is less than or equal to a set load rate threshold from the storage nodes 23 of the distributed storage system; and schedule the selected at least one storage node to concurrently read the data file of the original snapshot copy into a memory of the at least one storage node 23.

In some embodiments, the management and control node 21 may generate a data conversion task based on an index file of the original snapshot copy. The data conversion task is used to instruct the storage node 23 to convert the data file of the original snapshot copy into a data file of a new snapshot copy. Furthermore, the management and control node 21 may provide the data conversion task to the storage node 23.

The storage node 23 may execute the data conversion task; and in the process of performing the data conversion task, the data file of the original snapshot copy is read into the memory of the storage node 23. Specifically, the storage node 23 may read the data file of the original snapshot copy from physical address space of the data file of the original snapshot copy into the memory of the storage node 23 according to a correspondence between logical address space of the original snapshot copy and the physical address space of the data files of the original snapshot copy recorded in the index file of the original snapshot copy. Optionally, in order to improve data loading efficiency, the storage node 23 may adopt a delayed loading method to read the data file of the original snapshot copy from the physical address space of the data file of the original snapshot copy into the memory of the storage node 23.

Furthermore, the storage node 23 may write the data file of the original snapshot copy into the data file of the new snapshot copy. The data file of the new snapshot copy is stored in the distributed file system. Furthermore, a correspondence between the logical address space of the new snapshot copy and the physical address space of the data files of the new snapshot copy may be established; and the correspondence is written into the index file of the new snapshot copy to obtain the new snapshot copy. The index file of the new snapshot copy is also stored in the distributed file system, and forms a logical segment of the distributed file system together with the data files of the new snapshot copy.

In some embodiments, in order to increase the speed of generating a new snapshot copy and reduce data access delay, the management and control node 21 may obtain logical address space of the original snapshot copy from the index file of the original snapshot copy; and divide the logical address space of the original snapshot copy into multiple logical space shards. 'Multiple' means 2 or more than 2. In the embodiments of the present application, the specific implementation of the management and control node 21 dividing the logical address space of the original snapshot copy into multiple logical space shards is not limited. In some embodiments, the management and control node 21 may divide the logical address space of the original snapshot copy into multiple logical space shards according to the number of schedulable storage nodes in the distributed storage system and the amount of data of the original snapshot copy. The schedulable storage nodes in the distributed storage system may be all storage nodes in the distributed storage system, or may be part of the storage nodes, specifically referring to storage nodes that may perform computing tasks, such as storage nodes whose task load rate is less than or equal to the set load rate threshold, etc.

Optionally, the management and control node 21 may determine the address range of the logical space shards according to the number of schedulable storage nodes in the distributed storage system and the amount of data of the original snapshot copy. For example, assuming that the number of schedulable storage nodes is M and the amount of data of the original snapshot copy is N, the address range of the logical space shards is N/M. Furthermore, the logical address space of the original snapshot copy may be divided into multiple logical space shards with an address range of N/M.

After dividing the logical address space of the original snapshot copy into multiple logical space shards, the management and control node 21 may schedule multiple storage nodes to concurrently read data blocks corresponding to the multiple logical space shards in the original snapshot copy into memories of the multiple storage nodes 23. The number of the storage nodes may be the same as the number of the logical space shards, or may be greater than or less than the number of the logical space shards. To improve data conversion efficiency, the number of the storage nodes is greater than or equal to the number of the logical space shards. Scheduling the multiple storage nodes 23 to concurrently read the data files of the original snapshot copy may distribute a data reading task across the multiple storage nodes, which helps to improve the efficiency of data reading.

Optionally, the management and control node 21 may divide the multiple logical space shards into multiple data conversion tasks. The number of data conversion tasks is the same as the number of logical space shards. Each data conversion task is used to instruct to convert data corresponding to a logical space shard corresponding to the data conversion task into data of the new snapshot copy. Furthermore, the management and control node 21 may schedule multiple storage nodes 23 to perform the data conversion tasks concurrently. During the concurrent execution of the data conversion tasks, the multiple storage nodes 23 may concurrently read, from the original snapshot copy, data blocks corresponding to the logical space shards corresponding to the executed data conversion tasks into their respective memories.

Furthermore, for any storage node 23 used for data reading, a delayed loading method may be used to read, from the data files of the original snapshot copy, a data block corresponding to a logical space shard corresponding to a data conversion task performed by the storage node 23. In this way, data may be loaded on demand, which helps reduce memory consumption in a case where storage nodes read data.

For an access request initiated by an instance, the management and control node 21 may provide the instance with data to be accessed based on the data files in memories of the multiple storage nodes 23. Specifically, the management and control node 21 may schedule a block service node where the cloud disk is located to read the data to be accessed from the data files in the memories of the multiple storage nodes 23; and provide the data to be accessed to the instance. The instance may be started based on the data to be accessed. In this way, in a case where the block service node 22 reads the data to be accessed, the block service node 22 may read at least part of data blocks corresponding to the data to be accessed from the memory cache of the multiple storage nodes 23, without having to read data from a persistent storage medium corresponding to the distributed file system, which can reduce the access delay of the current data request and further improve the efficiency of data access.

Since there are data access hotspots in the original snapshot copy, in a case where this instance is restarted or other instances are started, the data access hotspot problem will still exists if the original snapshot copy is accessed. Based on this, in addition to providing timely responses to the current data request, the embodiments of the present application may also dynamically derive a new snapshot copy. Specifically, after the management and control node 21 schedules multiple storage nodes 23 to concurrently read the data files of the original snapshot copy, the multiple storage nodes 23 may also be scheduled to generate a new snapshot copy corresponding to a snapshot identifier based on the data files in the memories of the multiple storage nodes 23.

Specifically, the management and control node 21 may schedule multiple storage nodes 23 to concurrently write the data blocks in the memories of the multiple storage nodes 23 into the data files of the new snapshot copy; and establish a correspondence between logical address space of the new snapshot copy and physical address space of the data files of the new snapshot copy; thereafter, the correspondence may be written into an index file of the new snapshot copy to obtain the new snapshot copy.

The above data conversion task includes two stages: reading the data files of the original snapshot copy into the memories of the storage nodes, and generating new snapshot copies based on the data files in the memories.

Figure 9:
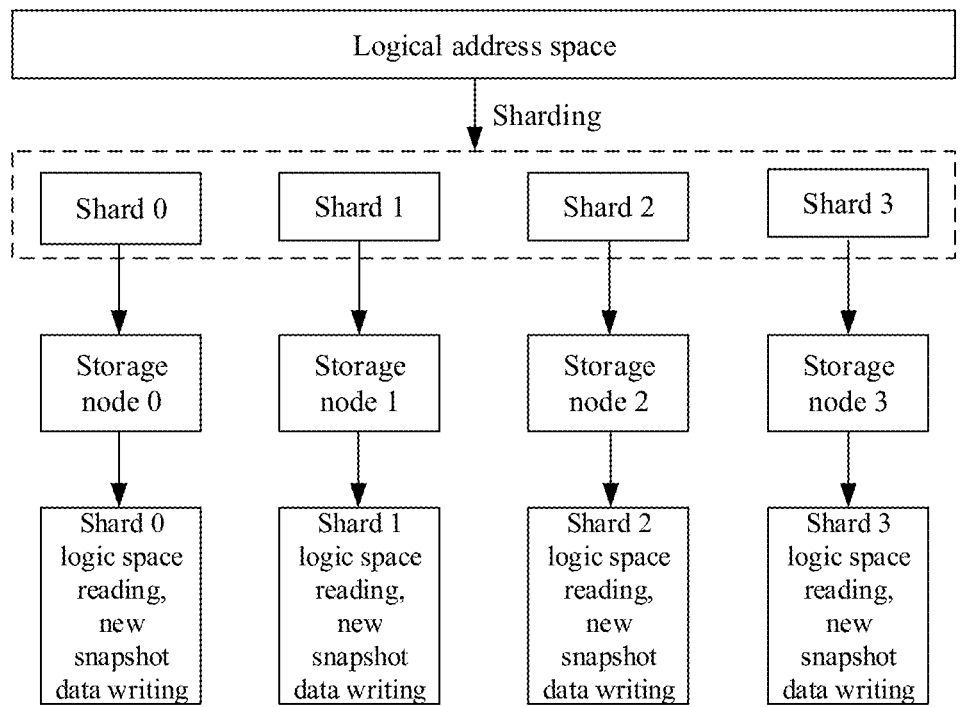
FIGS. 9 and 10 are schematic diagrams of logical address space shards provided in an embodiment of the present application.

In some embodiments, as shown in FIG. 9, the number of storage nodes scheduled by the management and control node 21 for performing the data conversion tasks is the same as the number of logical space shards. Each storage node is configured to perform one data conversion task. Accordingly, a storage node corresponding to each data conversion task has read and write permissions to the logical space shard corresponding to the data conversion task. In this embodiment, for any logical space shard, the management and control node 21 may schedule a first storage node 23 corresponding to the logical space shard to perform a data conversion task. Specifically, the management and control node 21 may schedule the first storage node 23 corresponding to the logical space shard to read a data block corresponding to the logical space shard from the data files of the original snapshot copy to the memory of the first storage node 23; and schedule the first storage node 23 to write the data block in its memory into the data files of the new snapshot copy.

Figure 10:
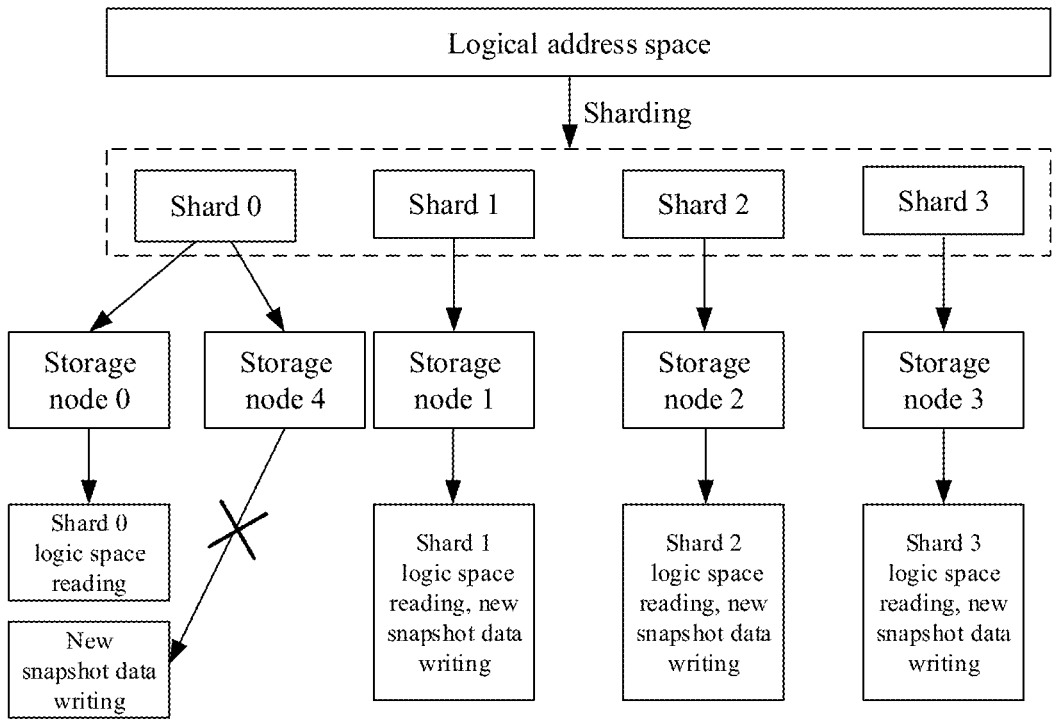

In some embodiments, as shown in FIG. 10, the number of storage nodes scheduled by the management and control node 21 for performing the data conversion tasks is larger than the number of logical space shards. In this embodiment, for the multiple logical space shards, there is at least one target logical space shard corresponding to at least 2 storage nodes. The target logical space shard refers to a logical space shard for which the number of scheduled storage nodes is at least 2. For example, in FIG. 10, the number of storage nodes for which the logical space shard 0 is scheduled is 2, and thus the logical space shard 0 is the target logical space shard. The storage nodes corresponding to the target logical space shard have read permission to the target logical space shard. However, in order to prevent concurrent write operations of multiple storage nodes on the target logical space shard, causing data writing conflicts, a certain one of the at least 2 storage nodes corresponding to the target logical space shard may be designated to have write permission to the target logical space shard. The storage node that has write permission to the target logical space shard is defined as a designated storage node. For example, in FIG. 10, storage node 0 of logical space shard 0 has write permission to the target logical space shard, and storage node with number 4 has no write permission.

The designated storage node may be designated by the management and control node 21. Optionally, the management and control node 21 may select any one storage node from the at least 2 storage nodes corresponding to the target logical space shard as the designated storage node. In the embodiments of the present application, for the convenience of description and distinction, the at least 2 storage nodes corresponding to the target logical space shard are defined as second storage nodes. The number of second storage nodes is at least 2.

For the target logical space shard, the management and control node 21 may schedule the second storage nodes corresponding to the target logical space shard to read data blocks corresponding to the target logical space shard from the data files of the original snapshot copy to the memories of the second storage nodes; and schedule the designated storage node to write the data blocks in the memories of the second storage nodes into the data files of the new snapshot copy. Optionally, the management and control node 21 may randomly select one storage node from the at least two storage nodes corresponding to the target logical space shard, and schedule this storage node to read the data blocks corresponding to the target logical space shard from the data files of the original snapshot copy. Alternatively, the management and control node 21 may select a target storage node with the smallest task load from the at least two storage nodes corresponding to the target logical space shard based on the task load situations of the at least two storage nodes corresponding to the target logical space shard; and schedule the target storage node to read the data blocks corresponding to the target logical space shard from the data files of the original snapshot copy, and so on.

The management and control node 21 schedules the multiple storage nodes to concurrently read data blocks corresponding to the logical space shards from the data files of the original snapshot copy into the memories of the multiple storage nodes, and writes the data blocks in the memories into the data files of the new snapshot copy. The above steps are performed until data reading from the data files of the original snapshot copy is completed, and then data files of the new snapshot copy are obtained, thereby realizing the conversion of the data files of the original snapshot copy into the data files of the new snapshot copy. The data files of the new snapshot copy may be stored in the distributed file system. The storage node 23 may write the read data block into the data files of the new snapshot copy in the distributed file system to obtain the data files of the new snapshot copy, thereby converting the data files of the original snapshot copy into the data files of the new snapshot copy.

After the storage node 23 converts the data files of the original snapshot copy into the data files of the new snapshot copy, the management and control node 21 may establish a correspondence between the logical address space of the new snapshot copy and the physical address space of the data files of the new snapshot copy; and schedule the storage node 23 to write the correspondence into an index file of the new snapshot copy, thereby generating the new snapshot copy.

Figure 11:
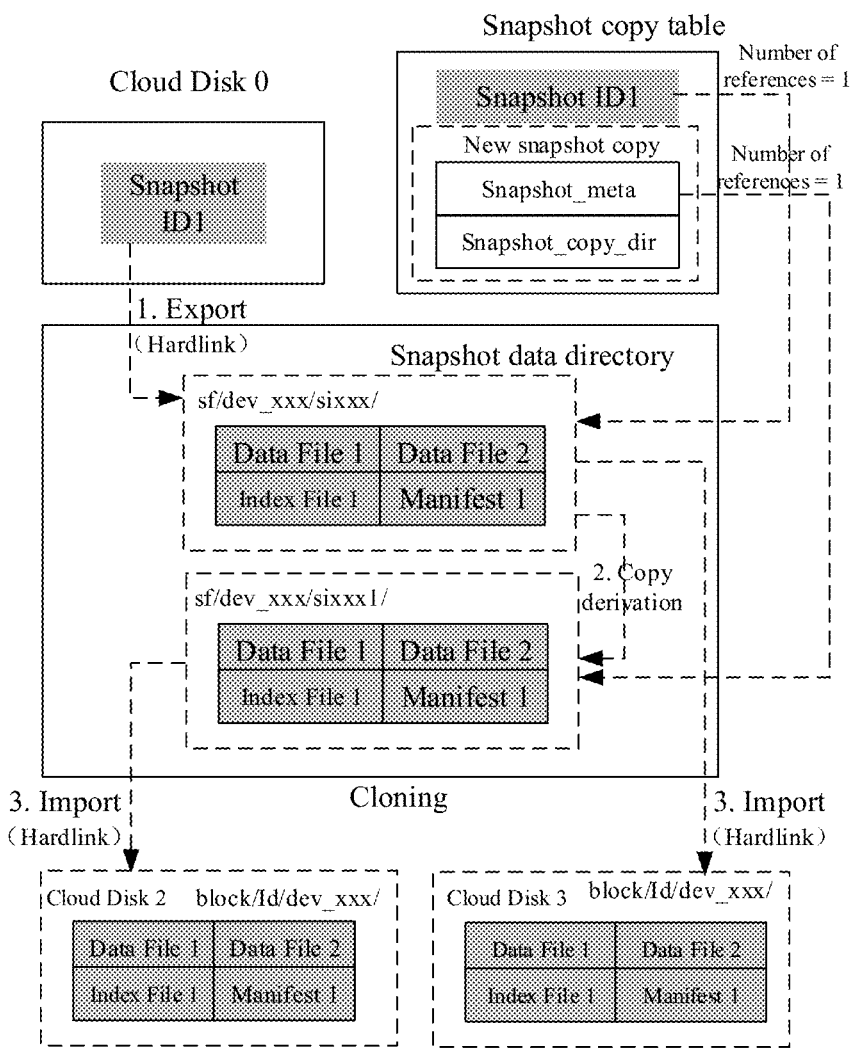
FIG. 11 is a schematic diagram of a reference relationship of physical files of multiple snapshot copies provided in an embodiment of the present application.

Specifically, the management and control node 21 may schedule any storage node 23 to write the correspondence between the logical address space of the new snapshot copy and the physical address space of the data files of the new snapshot copy into the index file of the new snapshot copy. Of course, the management and control node 21 may also schedule the storage node 23 that performs the data conversion task to write the above correspondence into the index file of the new snapshot copy. As shown in FIG. 11, the index file and the data files of the new snapshot copy are stored in the same logical segment in the distributed file system and are stored independently from the physical files of the original snapshot copy. The storage medium corresponding to the distributed file system may be provided such that it is scheduled by the management and control node 21 to the multiple storage nodes 23 for performing data conversion tasks.

In FIG. 11, the index file of the new snapshot copy and the physical files of the original snapshot copy have independent snapshot data directories. Data directory of the physical files of the original snapshot copy is sf/dev_xxx/sixxx/; snapshot data directory of the physical file of the index file of the new snapshot copy is sf/dev_xxx/sixxx_1/.

After obtaining the new snapshot copy, the management and control node 21 may import physical files of the new snapshot copy into a cloud disk accessed by the instance. In this way, the data to be accessed may be provided to the instance based on the physical files of the new snapshot copy corresponding to the cloud disk. The instance or other instances may read the data to be accessed required for the data request from the physical files of the new snapshot copy. In this way, the access traffic to the data to be accessed can be dispersed to different snapshot copies, which can reduce the probability of data access hotspots and even eliminate data access hotspots, thereby helping to speed up data access efficiency and reduce data access latency.

In the embodiments of the present application, access of a current data request of an instance and generation of a new snapshot copy can reuse data files read into the memories by the multiple storage nodes, thereby reducing the traffic impact on a cluster where the distributed file system is located. This is because if the data request of the instance and the generation of the new snapshot copies do not reuse the data files read into the memories by the multiple storage nodes, but independently read the data files of the original snapshot copy from the distributed file system, in a case where a large number of instances are started, there will be a large amount of access traffic to the cluster where the distributed file system is located. Therefore, in the embodiments of the present application, the access of the data request and the generation of the new snapshot copies can reuse the data files read into the memories by the multiple storage nodes, thereby reducing the traffic impact on the cluster where the distributed file system is located.

Figure 12:
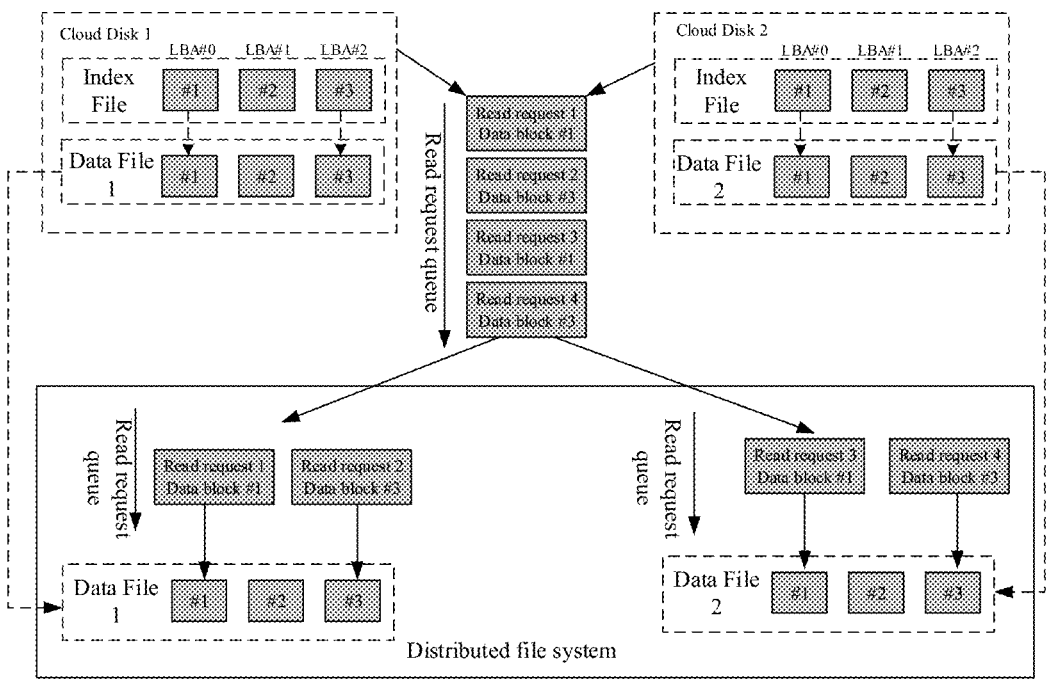
FIG. 12 is a schematic diagram of referencing multiple snapshot copies to clone cloud disks in batch provided in an embodiment of the present application.

For a generated new snapshot copy, as shown in FIG. 12, after the physical files of the new snapshot copy are imported into cloud disks, data files referenced by cloud disk 1 and cloud disk 2 are implemented as different data files at the distributed file system level. The data files referenced by cloud disk 1 and cloud disk 2 are actually derived into different independent data files at the distributed file system level. For example, in FIG. 12, data requests of cloud disk 1 and cloud disk 2 for data block #1 and data block #3 may be distributed to data file1 and data file2 corresponding to different snapshot copies, reducing the access traffic of a single snapshot copy. Compared with the cloud disk cloning method of single snapshot copy, the reading pressure of cloning cloud disks in batch is dispersed to different data files, thereby reducing snapshot data reading hotspots and data reading delays.

In the embodiments of the present application, the specific implementation of the management and control node 21 importing physical files of the new snapshot copy into the cloud disks is not limited. In some embodiments, in order to enable multiple cloud disks to share the physical files of the new snapshot copy, the management and control node 21 may import physical files of the new snapshot copy into the cloud disks via hard links.

Hard link refers to one or more file names of a file, which links the file names and node numbers used by the computer file system. Therefore, we may link to the same file with multiple file names, and these file names may be in the same directory or different directories. If a file has several file names, then the number of links of the file is the number of these file names. For example, a file with a link number of 1 means that the file has only one file name. Hard links may be used to allow multiple file names that are not in the same directory or in the same directory to modify the same file at the same time. In a case where a file corresponding to one file name is modified, all files having hard link relationship to it may be modified together.

In the present embodiments, on the cloud disk, the management and control node 21 may set target file names for the data files of the new snapshot copy via the method of hard links; and link the target file names corresponding to the cloud disk with the data files of the new snapshot copy via the method of hard links, thereby realizing reference to the physical files of the new snapshot copy by the cloud disk, thereby importing the data of the new snapshot copy into the cloud disk. In this way, the instance may read the data to be accessed required by the data request from the physical files of the new snapshot copy corresponding to the cloud disk.

As shown in FIG. 11, the distributed file system may also set a snapshot copy table for recording associated references and reference times of the snapshot copy. In FIG. 11, the number of references to the original snapshot copy (snapshot ID1) in the snapshot copy table is 1; the number of references to the new snapshot copy is also 1. In FIG. 11, in the snapshot copy table, snapshot_meta indicates metadata of the snapshot; snapshot_copy_dir indicates path information of the snapshot copy. Correspondingly, after the physical files of the new snapshot copy are imported into the cloud disk, the number of references to the new snapshot copy is increased by 1.

In the embodiments of the present application, as shown in FIG. 8b, before snapshot copy data is imported into a cloud disk, a target logical block address in the index file of the cloud disk which points to the data file of the original snapshot copy is marked as a designated identifier. For example, in FIG. 8b, logical block addresses LBA #3, LBA #4 and LBA #5 are marked as −1 to identify delayed loaded logical blocks.

Correspondingly, after the physical files of the new snapshot copy are imported into the cloud disk, the management and control node 21 may also modify the target logical block address in the index file of the cloud disk to the physical address space that points to the data files of the new snapshot copy. Optionally, the management and control node 21 may schedule the block service node 22 where the cloud disk is located to modify the target logical block address in the index file of the cloud disk to the physical address space that points to the data files of the new snapshot copy. For example, in FIG. 8b, after the physical files of the new snapshot copy are imported into the cloud disk, the logical block addresses LBA #3, LBA #4, and LBA #5 are modified to the physical address space that points to the data file X of the new snapshot copy. In this way, after the management and control node 21 imports the physical files of the new snapshot copy into the cloud disk, the instance may read the data to be accessed required by the data request from the physical files of the new snapshot copy corresponding to the cloud disk.

Specifically, the management and control node 21 may dispatch a data request sent by an instance to a block service node 22 where the cloud disk is located. The block service node 22 may read the data to be accessed required for the data request based on the physical files of the new snapshot copy corresponding to the cloud disk. Specifically, the block service node 22 may determine the logical address of a data block corresponding to the data to be accessed; and query the index file of the new snapshot copy according to the logical address of the data block to obtain the physical address corresponding to the logical address of the data block; further, according to the physical address of the data block, the data block may be read from the data files of the new snapshot copy until the reading of the data to be accessed is completed. Furthermore, the block serving node 22 may provide the data to be accessed to the instance. The instance may be started with the data to be accessed.

In the embodiments of the present application, in FIG. 8a, the virtualized service node 20 may provide elastic cloud services and dynamically create or reduce instances according to actual application requirements. In the embodiments of the present application, the management and control node 21, the block service node 22 and the storage node 23 together constitute block storage backend of the elastic cloud service. The following is an exemplary description of the data access method provided in the embodiments of the present application based on logical architecture of the distributed storage system provided in the embodiments of the present application.

Figure 13:
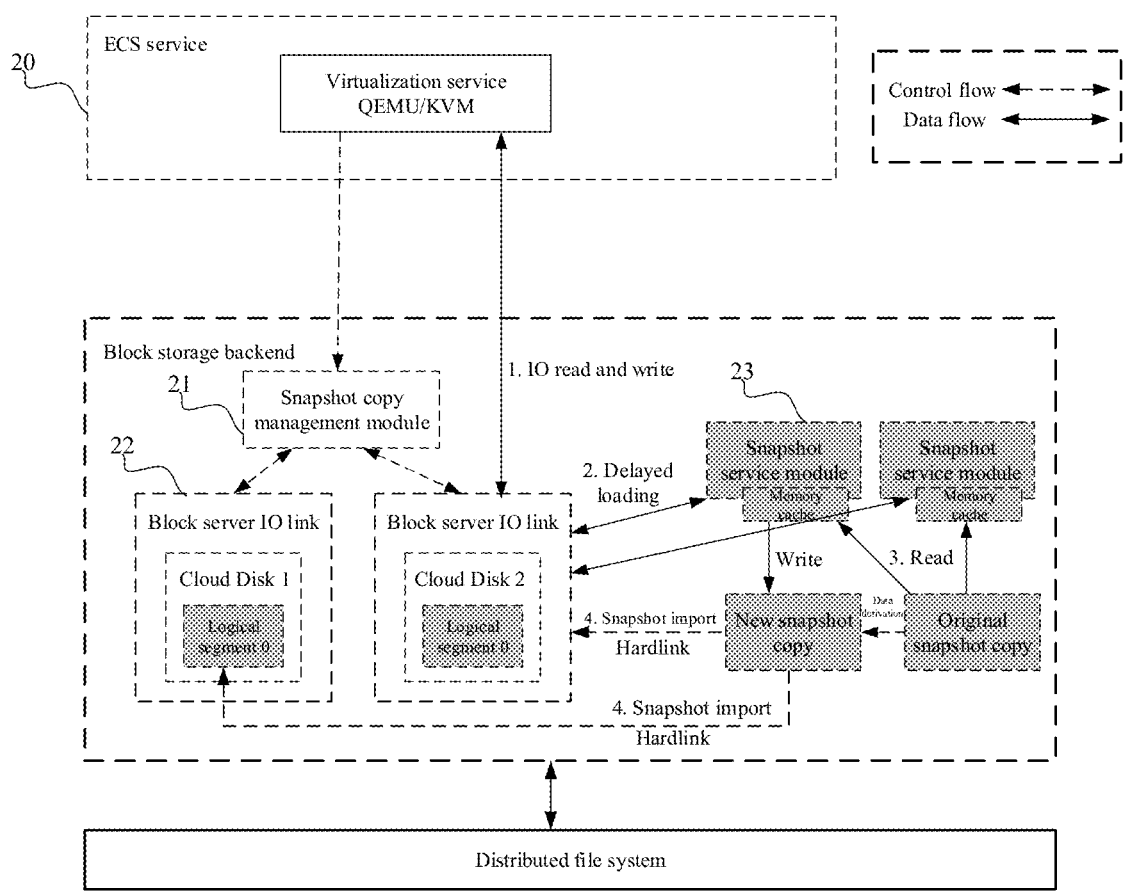
FIG. 13 is a schematic diagram illustrating a distributed storage system manages multiple snapshot copies provided in an embodiment of the present application.
Figure 14:
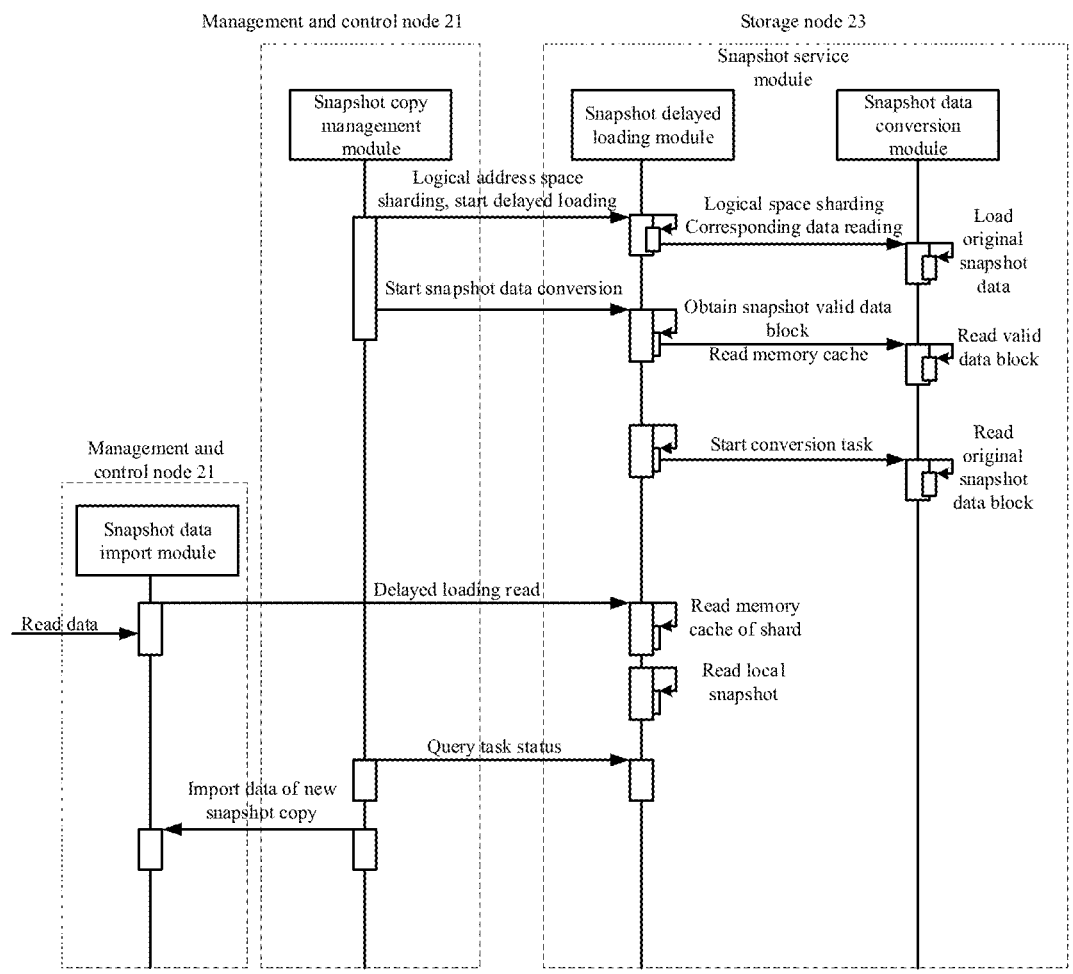
FIG. 14 is a schematic diagram of a data conversion process for multiple snapshot copies provided in an embodiment of the present application.

FIG. 13 is a schematic diagram of a logical architecture of a distributed storage system provided in an embodiment of the present application. FIG. 14 is a schematic diagram of process interaction between components in a case where an instance accesses a newly created cloud disk under the logical architecture diagram provided in an embodiment of the present application. With reference to FIG. 13 and FIG. 14, a snapshot copy management module and a snapshot data import module may be deployed on the management and control node 21; the cloud disk is set on the block service node 22; and a snapshot service module is deployed on the storage node 23. As shown in FIG. 14, from the perspective of logical functions, the snapshot service module may be divided into a data delay loading module and a snapshot data conversion module. The following is an exemplary description of the data access method provided in the embodiments of the present application based on the logical architecture of the distributed storage system provided in the embodiments of the present application.

In conjunction with FIG. 13 and FIG. 14, for the original snapshot copy, the snapshot copy management module may divide the logical address space of the original snapshot copy into multiple logical space shards. For the specific implementation of dividing the logical address space of the original snapshot copy into multiple logical space shards, please refer to the relevant content of the above embodiment, which will not be repeated here. Afterwards, the snapshot copy management module may assign the multiple logical space shards to multiple data conversion tasks; and schedule multiple storage nodes 23 to concurrently execute the multiple data conversion tasks.

For any storage node 23, for any storage node 23 used to perform data reading, its snapshot delayed loading module may start a delayed loading task; the snapshot data conversion module may use the delayed loading method to load data files of the original snapshot copy, and store the read data files in the memory cache of the storage node 23. The management and control node 21 may also trigger multiple storage nodes 23 to concurrently perform data conversion tasks. Specifically, the snapshot data conversion module may preferentially read valid data blocks of the original snapshot copy from the memory cache of the storage node 23. The valid data blocks of the original snapshot copy refer to data blocks required for an instance to start up. Furthermore, the snapshot data conversion module may write the read valid data blocks into a data file corresponding to the new snapshot copy, thereby realizing data conversion of the read valid data blocks. For data blocks that are not read in the memory cache, the snapshot data conversion module may use a delayed loading method to read, from the data files of the original snapshot copy, data blocks corresponding to logical space shards corresponding to the data conversion task being executed; and write the read data blocks to the data file corresponding to the new snapshot copy to realize data conversion of the read data blocks.

The snapshot data conversion module reads the data blocks corresponding to the target logical space shards, and writes the read data blocks into the data files of the new snapshot copy. The above step is continued until data reading from the data files of the original snapshot copy is completed, thereby obtaining the data files of the new snapshot copy, thereby realizing the conversion of the data files of the original snapshot copy into the data files of the new snapshot copy. The snapshot copy management module may query the task status of the data conversion task. In a case where the task status of the data conversion tasks is all completed, it means that the reading of the data in the data files of the original snapshot copy is completed.

After the data files of the original snapshot copy are converted into the data files of the new snapshot copy, the snapshot copy management module may establish a correspondence between logical address space of the new snapshot copy and physical address space of the data files of the new snapshot copy; and schedule the storage node to write the correspondence into the index file of the new snapshot copy, thereby generating the new snapshot copy.

After obtaining the new snapshot copy, the snapshot data import module may import physical files of the new snapshot copy into a cloud disk accessed by an instance. In this way, data to be accessed may be provided to the instance based on the physical files of the new snapshot copy corresponding to the cloud disk. The instance may read the data to be accessed required by the data request from the physical files of the new snapshot copy corresponding to the cloud disk.

In the embodiments of the present application, in order to further improve data access efficiency, reduce data access latency, and better solve data access hotspot problems, in some embodiments of the present application, for multiple storage nodes scheduled by the management and control node to perform data conversion tasks, the snapshot data conversion module may also write the read data blocks into the memories of the storage nodes. In this way, in a case where the block service node reads the data to be accessed, it may read at least part of data blocks corresponding to the data to be accessed from the memory caches of multiple storage nodes, without having to read data in a persistent storage medium corresponding to the distributed file system, which may further improve the efficiency of data access. The snapshot service node may adopt a delayed loading method to read at least part of data blocks corresponding to the data to be accessed from the memory caches of the multiple storage nodes.

In addition to the distributed storage system provided in the above-mentioned embodiments, embodiments of the present application also provide a data access method. The data access method provided in the embodiments of the present application is exemplarily described below.

Figure 15:
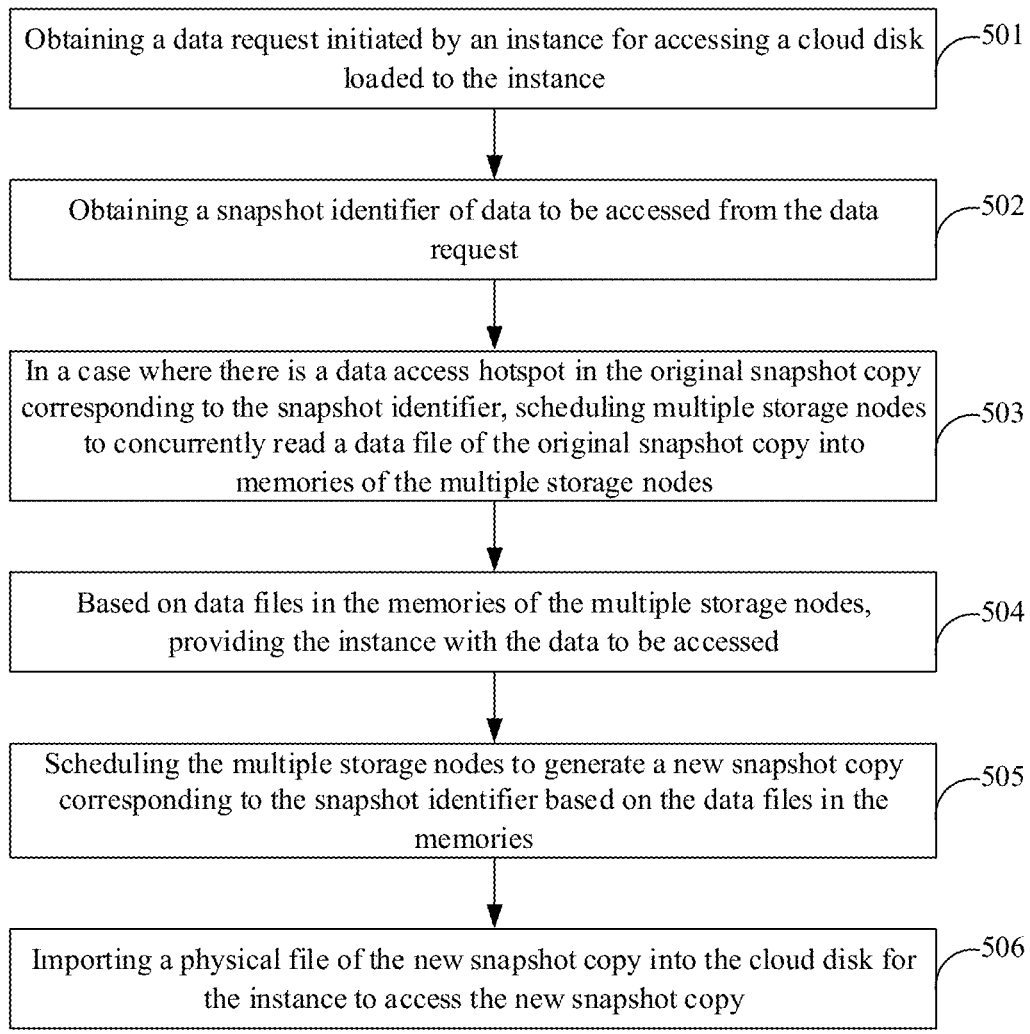
FIG. 15 is a schematic flowchart of a data access method provided in an embodiment of the present application.

FIG. 15 is a schematic flowchart of a data access method provided in an embodiment of the present application; and as shown in FIG. 15, the data access method includes:

Step 501: obtaining a data request initiated by an instance for accessing a cloud disk loaded to the instance.

Step 502: obtaining a snapshot identifier of data to be accessed from the data request.

Step 503: in a case where there is a data access hotspot in an original snapshot copy corresponding to the snapshot identifier, scheduling multiple storage nodes to concurrently read a data file of the original snapshot copy into memories of the multiple storage nodes.

Step 504: based on data files in the memories of the multiple storage nodes, providing the instance with the data to be accessed.

Step 505: scheduling the multiple storage nodes to generate a new snapshot copy corresponding to the snapshot identifier based on the data files in the memories.

Step 506: importing a physical file of the new snapshot copy into the cloud disk for the instance to access the new snapshot copy.

In the embodiments of the present application, the cloning process of the cloud disk may be divided into: a cloud disk creation process and a snapshot data import process. For a newly created cloud disk, even if the import of snapshot copy data has not been completed, it has already been loaded to the instance, allowing the instance to access the cloud disk at this point. Accordingly, during the startup process of the instance, a data request may be initiated to the cloud disk loaded to the instance.

For data to be accessed required by the data request, the block service node may be scheduled to load the data by using a delayed loading method, and provide the loaded data to the instance for the instance to start. Since the cloud disk has not yet imported the snapshot copy data, it needs to import the snapshot copy data into the cloud disk. In the embodiments of the present application, a delayed loading method may be adopted for the snapshot copy data, that is, the snapshot copy data is imported into the cloud disk only when the instance accesses the snapshot copy data.

In the embodiments of the present application, in order to solve the data access hotspot problem caused by accessing a single snapshot copy in the above embodiments, in step 501, the data request sent by the instance to the cloud disk may be obtained; and in step 502, a snapshot identifier corresponding to data to be accessed may be obtained from the data request.

Further, the snapshot copy corresponding to the snapshot identifier may be obtained from snapshot copies stored in the storage node. This snapshot copy may be defined as the original snapshot copy. The number of the original snapshot copy may be 1 or multiple. 'Multiple' means 2 or more than 2. In the embodiments of the present application, in order to solve the data access hotspot problem caused by accessing the same snapshot copy to clone a large number of cloud disks, the data access hotspot situation of the original snapshot copy may be first determined; and it is determined whether to dynamically derive a new snapshot copy based on the data hotspot situation of the original snapshot copy. In the embodiments of the present application, the specific implementation of determining the data access hotspot of the original snapshot copy is not limited. Several optional implementations are described below as examples.

Implementation 1: In some embodiments, the number of references to the original snapshot copy may be obtained, and it is determined whether the number of references to the original snapshot copy is greater than or equal to the threshold number of references. If the determination result is that the number of references to the original snapshot copy is greater than or equal to the threshold number of references, it is determined that there are data access hotspots in the original snapshot copy. In the embodiments of the present application, the specific value of the threshold number of references is not limited. In some embodiments, the threshold number of references may be set based on prior knowledge. In other embodiments, the threshold number of references may be determined through stress testing, etc.

Implementation 2: In the field of cloud computing, performance of a cloud disk may be monitored. The performance of a cloud disk includes: data reading time delay of the cloud disk. The data reading time delay of the cloud disk may be determined by time difference between the time when a data request to the cloud disk is received and the time when data required for the data request is read from the cloud disk. The longer the data reading time delay of the cloud disk, the more serious the data hotspot problem of the cloud disk is. Accordingly, the data reading time delay of a cloud disk that references the original snapshot copy may be obtained; and it is determined whether the data reading time delay is greater than or equal to the set time delay threshold; if the determination result is yes, it is determined that a data access hotspot problem exists in the original snapshot copy.

The above embodiments 1 and 2 are merely exemplary and do not constitute limitations. The above embodiments 1 and 2 may be implemented either one or in combination. In a case where implementations 1 and 2 are implemented in combination, it may be determined that there is a data access hotspot problem in the original snapshot copy in a case where the number of references to the original snapshot copy is greater than or equal to the threshold number of references, and the data reading time delay of the cloud disk that references the original snapshot copy is greater than or equal to the set time delay threshold. Of course, if the determination result is yes, it may also be determined that there is a data access hotspot problem in the original snapshot copy; and so on.

In the embodiments of the present application, in a case where there are no data access hotspots in the original snapshot copy, the data of the original snapshot copy may be imported into the cloud disk accessed by the instance, so that the cloud disk may share the original snapshot copy with other cloud disks. Accordingly, a target logical block address in the index file of the cloud disk which points to the data file of the original snapshot copy may be modified to the physical address of the data file of the original snapshot copy.

Afterwards, the instance may read data to be accessed from data of the original snapshot copy corresponding to the cloud disk; and start the instance using the data to be accessed. Due to distributed storage of the data of the original snapshot copy in the storage node, the storage node may use delayed loading (or lazy load) to read the data to be accessed from the data of the original snapshot copy; and provide the data to be accessed to the instance. The instance may be started with the data to be accessed.

Accordingly, in a case where there are data access hotspots in the original snapshot copy, in step 503, multiple storage nodes may be scheduled to concurrently read data files of the original snapshot copy into memories of the multiple storage nodes.

The storage nodes that the management and control node schedules to perform the data conversion tasks may include: a storage node that stores the original snapshot copy, and of course, may not include the storage node that stores the original snapshot copy.

Optionally, based on task load conditions of the storage nodes in the distributed storage system, multiple storage nodes whose task load rates are less than or equal to a set load rate threshold may be selected from the storage nodes of the distributed storage system; and the selected multiple storage nodes may be scheduled to concurrently read the data files of the original snapshot copy into memories of the multiple storage nodes.

In some embodiments, a data conversion task may be generated based on an index file of the original snapshot copy. This data conversion task is used to instruct the storage nodes to convert the data files of the original snapshot copy into data files of the new snapshot copy. Furthermore, the storage nodes may be scheduled to perform data conversion tasks.

Specifically, the storage nodes may be scheduled to read the data files of the original snapshot copy into the memories of the storage nodes according to the index file of the original snapshot copy. Furthermore, the storage nodes may be scheduled to write the data files in the memories into the data files of the new snapshot copy. Furthermore, a correspondence between the logical address space of the new snapshot copy and the physical address space of the data files of the new snapshot copy may be established; and the storage nodes are scheduled to write the correspondence into the index file of the new snapshot copy to obtain the new snapshot copy. The index file of the new snapshot copy is also stored in the distributed file system, and forms a logical segment of the distributed file system together with the data files of the new snapshot copy.

In some embodiments, in order to increase the speed of generating a new snapshot copy and reduce data access delay, logical address space of the original snapshot copy may be obtained from the index file of the original snapshot copy; and the logical address space of the original snapshot copy may be divided into multiple logical space shards. 'Multiple' means 2 or more than 2.

In the embodiments of the present application, the specific implementation of dividing the logical address space of the original snapshot copy into multiple logical space shards is not limited. In some embodiments, the logical address space of the original snapshot copy may be divided into multiple logical space shards according to the number of schedulable storage nodes in the distributed storage system and the amount of data of the original snapshot copy. The schedulable storage nodes in the distributed storage system may be all storage nodes in the distributed storage system, or may be part of the storage nodes, specifically referring to storage nodes that may perform computing tasks, such as storage nodes whose task load rate is less than or equal to the set load rate threshold, etc.

Optionally, the address range of the logical space shards may be determined according to the number of schedulable storage nodes in the distributed storage system and the amount of data of the original snapshot copy. For example, assuming that the number of schedulable storage nodes is M and the amount of data of the original snapshot copy is N, the address range of the logical space shards is N/M. Furthermore, the logical address space of the original snapshot copy may be divided into multiple logical space shards with an address range of N/M.

After dividing the logical address space of the original snapshot copy into multiple logical space shards, the multiple storage nodes may be scheduled to concurrently read data blocks corresponding to the multiple logical space shards from the original snapshot copy into the memories of the multiple storage nodes. The number of storage nodes may be the same as the number of logical space shards, or may be greater than or less than the number of logical space shards. To improve data conversion efficiency, the number of storage nodes is greater than or equal to the number of logical space shards. Scheduling the multiple storage nodes to concurrently read the data files of the original snapshot copy may distribute data reading tasks across the multiple storage nodes, which helps to improve the efficiency of data reading.

Optionally, multiple storage nodes may be scheduled to adopt a delayed loading method to concurrently read data blocks corresponding to multiple logical space shards from the original snapshot copy into the memories of multiple storage nodes. In this way, data may be loaded on demand, which helps reduce memory consumption in a case where storage nodes read data.

For an access request initiated by an instance, in step 504, the data to be accessed may be provided for the instance based on the data files in memories of the multiple storage nodes. Specifically, the block service node where the cloud disk is located may be scheduled to read the data to be accessed from the data files in the memories of the multiple storage nodes; and the data to be accessed is provided to the instance. The instance may be started based on the data to be accessed. In this way, in a case where the block service node reads the data to be accessed, the block service node may read at least part of data blocks corresponding to the data to be accessed from the memory cache of the multiple storage nodes, without having to read data in a persistent storage medium corresponding to the distributed file system, which can reduce the access delay of the current data request and further improve the efficiency of data access.

Since there are data access hotspots in the original snapshot copy, in a case where this instance is restarted or other instances are started, the data access hotspot problem will still exists if the original snapshot copy is accessed. Based on this, in addition to providing timely responses to the current data request, the embodiments of the present application may also dynamically derive a new snapshot copy. Specifically, after the multiple storage nodes are scheduled to concurrently read the data files of the original snapshot copy, in step 505, the multiple storage nodes may also be scheduled to generate a new snapshot copy corresponding to a snapshot identifier based on the data files in the memories of the multiple storage nodes.

In the embodiments of the present application, steps 504 and 505 may be performed in parallel or in series. In a case where the two steps are performed in series, the order in which steps 504 and 505 are performed is not limited. Preferably, steps 504 and 505 are performed in parallel.

Specifically, multiple storage nodes may be scheduled to concurrently write data blocks in the memories of the multiple storage nodes into data files of the new snapshot copy; and a correspondence between the logical address space of the new snapshot copies and the physical address space of the data files of the new snapshot copy may be established; thereafter, the correspondence may be written into the index file of the new snapshot copy to obtain the new snapshot copy.

In some embodiments, the number of storage nodes scheduled for performing data conversion tasks is the same as the number of logical space shards. Each storage node is configured to perform one data conversion task. The above data conversion task includes two stages: reading the data files of the original snapshot copy into the memories of the storage nodes, and generating new snapshot copies based on the data files in the memories.

Accordingly, a storage node corresponding to each data conversion task has read and write permissions to the logical space shard corresponding to the data conversion task. In this embodiment, for any logical space shard, a storage node corresponding to the logical space shard may be scheduled to perform the data conversion task. Specifically, a first storage node corresponding to the logical space shard may be scheduled to read a data block corresponding to the logical space shard from the data files of the original snapshot copy into the memory of the first storage node; and the first storage node may be scheduled to write the data block in its memory into the data files of the new snapshot copy.

In other embodiments, the number of storage nodes scheduled for performing the data conversion tasks is larger than the number of logical space shards. In this embodiment, for the multiple logical space shards, there is at least one target logical space shard corresponding to at least 2 storage nodes. The target logical space shard refers to a logical space shard for which the number of scheduled storage nodes is at least 2. The storage nodes corresponding to the target logical space shard have read permission to the target logical space shard. However, in order to prevent concurrent write operations of multiple storage nodes on the target logical space shard, causing data writing conflicts, a certain one of the at least 2 storage nodes corresponding to the target logical space shard may be designated to have write permission to the target logical space shard. The storage node that has write permission to the target logical space shard is defined as the designated storage node. Regarding the method for determining the designated storage node, reference may be made to the relevant content of the above embodiments, which will not be described in detail here.

For the target logical space shard, a second storage node corresponding to the target logical space shard may be scheduled to read data blocks corresponding to the target logical space shard from the data files of the original snapshot copy to the memory of the second storage node; and the designated storage node may be scheduled to write the data blocks in the memory of the second storage node into the data files of the new snapshot copy. Regarding the method for determining the storage node for reading the data blocks corresponding to the target logical space shard, reference may be made to the relevant content of the above embodiments, which will not be repeated here.

Multiple storage nodes are scheduled to concurrently read data blocks corresponding to logical space shards from the data files of the original snapshot copy, and write the data blocks in the memories into the data files of the new snapshot copy. The above steps are performed until data reading from the data files of the original snapshot copy is completed, and then the data files of the new snapshot copy are obtained, thereby realizing the conversion of the data files of the original snapshot copy into the data files of the new snapshot copy. The data files of the new snapshot copy may be stored in the distributed file system. The storage nodes may be scheduled to write the read data blocks into the data files of the new snapshot copy in the distributed file system to obtain the data files of the new snapshot copy, thereby converting the data files of the original snapshot copy into the data files of the new snapshot copy.

After the storage nodes convert the data files of the original snapshot copy into the data files of the new snapshot copy, a correspondence between logical address space of the new snapshot copy and physical address space of the data files of the new snapshot copy may be established; and the storage nodes may be scheduled to write the correspondence into the index file of the new snapshot copy, thereby generating the new snapshot copy. Regarding the data storage format of the new snapshot copy, reference may be made to the relevant content of the above embodiments, which will not be described in detail here.

After obtaining the new snapshot copy, in step 506, the physical files of the new snapshot copy may be imported into a cloud disk accessed by an instance. In this way, the data to be accessed may be provided to the instance based on the physical files of the new snapshot copy corresponding to the cloud disk. The instance may read the data to be accessed required by the data request from the physical files of the new snapshot copy corresponding to the cloud disk. The instance here may be the above-mentioned instance that initiates a data request, or may be other instances. In this way, the access traffic to the data to be accessed may be dispersed to different snapshot copies, which can reduce the probability of data access hotspots and even eliminate data access hotspots, thereby helping to speed up data access efficiency and reduce data access latency.

In the embodiments of the present application, access of a current data request of an instance and generation of a new snapshot copy may reuse data files read into the memories by the multiple storage nodes, thereby reducing the traffic impact on a cluster where the distributed file system is located. This is because if the data request of the instance and the generation of the new snapshot copy do not reuse the data files read into the memories by the multiple storage nodes, but independently read the data files of the original snapshot copy from the distributed file system, in a case where a large number of instances are started, there will be a large amount of access traffic to the cluster where the distributed file system is located. Therefore, in the embodiments of the present application, the access of the data request and the generation of the new snapshot copy may reuse the data files read into the memories by the multiple storage nodes, thereby reducing the traffic impact on the cluster where the distributed file system is located.

In the embodiments of the present application, the specific implementation of importing physical files of the new snapshot copy into the cloud disks is not limited. In some embodiments, in order to enable multiple cloud disks to share the physical files of the new snapshot copy, the physical files of the new snapshot copy may be imported into the cloud disks via hard links.

In the embodiments of the present application, before snapshot copy data is imported into a cloud disk, a target logical block address in the index file of the cloud disk which points to the data file of the original snapshot copy is marked as a designated identifier. Correspondingly, after the physical files of the new snapshot copy are imported into the cloud disk, the target logical block address in the index file of the cloud disk may also be modified to physical address space that points to the data files of the new snapshot copy. Optionally, a block service node where the cloud disk is located may be scheduled to modify the target logical block address in the index file of the cloud disk to physical address space that points to the data files of the new snapshot copy. In this way, after the physical files of the new snapshot copy are imported into the cloud disk, the instance may read the data to be accessed required by the data request from the physical files of the new snapshot copy corresponding to the cloud disk. Regarding the specific implementation of the instance reading the data to be accessed required for the data request from the physical files of the new snapshot copy corresponding to the cloud disk, reference may be made to the relevant content of the above embodiments, which will not be repeated here.

It should be noted that the entity performing each step of the method provided in the above embodiments may be the same device, or the method may be performed by different devices. For example, the entity performing steps 501 and 502 may be device A; for another example, the entity performing step 501 may be device A, and the entity performing step 502 may be device B; and so on.

In addition, some of the processes described in the above embodiments and drawings include multiple operations that appear in a specific order, but it should be clearly understood that these operations may not be performed in the order as described herein or may be performed in parallel. The operation serial numbers, such as 504, 505, etc., are only used to distinguish different operations, and the serial numbers themselves do not represent any performing order.

Additionally, these processes may include more or fewer operations, and the operations may be performed sequentially or in parallel.

Correspondingly, embodiments of the present application further provide a computer-readable storage medium having computer instructions stored thereon which, when executed by one or more processors, cause the one or more processors to perform the steps in the above data access method.

Figure 16:
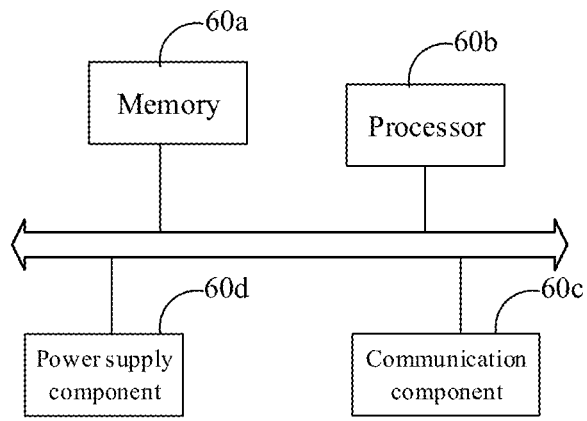
FIG. 16 is a schematic structural diagram of a computing device provided in an embodiment of the present application.

FIG. 16 is a schematic structural diagram of a computing device provided in an embodiment of the present application. As shown in FIG. 16, the computing device includes: a memory 60a, a processor 60b and a communication component 60c; wherein the memory 60a is configured to store a computer program.

The processor 60b is coupled to the memory 60a and the communication component 60c, and is configured to execute the computer program to: obtain a data request initiated by an instance for accessing a cloud disk loaded to the instance through the communication component 60c; obtain a snapshot identifier of data to be accessed from the data request; in a case where there is a data access hotspot in an original snapshot copy corresponding to the snapshot identifier, schedule multiple storage nodes to concurrently read a data file of the original snapshot copy into memories of the multiple storage nodes; based on data files in the memories of the multiple storage nodes, provide the instance with the data to be accessed; schedule the multiple storage nodes to generate a new snapshot copy corresponding to the snapshot identifier based on the data files in the memories; and import a physical file of the new snapshot copy into the cloud disk for the instance to access the new snapshot copy.

The processor 60b is further configured to perform at least one of the following determination operations:
obtaining data read time delay of a cloud disk that references the original snapshot copy; determining whether the data read time delay is greater than or equal to a set time delay threshold; obtaining the number of references to the original snapshot copy; determining whether the number of references to the original snapshot copy is greater than or equal to a set threshold number of references; and
if a determination result of the at least one determination operation is yes, determining that there is a data access hotspot in the original snapshot copy.

Optionally, when importing the physical file of the new snapshot copy into the cloud disk, the processor 60b is specifically configured to import the data file of the new snapshot copy into the cloud disk via a hard link method.

Optionally, when scheduling multiple storage nodes to concurrently read the data file of the original snapshot copy into memories of the multiple storage nodes, the processor 60b is specifically configured to: obtain the logical address space of the original snapshot copy from the index file of the original snapshot copy; divide the logical address space of the original snapshot copy into multiple logical space shards; and schedule multiple storage nodes to concurrently read data blocks corresponding to the multiple logical space shards from the original snapshot copy into the memories of the multiple storage nodes.

Optionally, when scheduling multiple storage nodes to concurrently read the data blocks corresponding to the multiple logical space shards from the original snapshot copy into the memories of the multiple storage nodes, the processor 60b is specifically configured to: schedule the multiple storage nodes to adopt a delayed loading method to concurrently read the data blocks corresponding to the multiple logical space shards from the data file of the original snapshot copy into the memories of the multiple storage nodes.

Accordingly, when scheduling the multiple storage nodes to generate a new snapshot copy corresponding to the snapshot identifier based on the data files in the memories, the processor 60b is specifically configured to: schedule the multiple storage nodes to concurrently write the data blocks in the memories into the data file of the new snapshot copy; establish a correspondence between the logical address space of the new snapshot copy and the physical address space of the data file of the new snapshot copy; and write the correspondence into an index file of the new snapshot copy to obtain the new snapshot copy.

In other embodiments, the number of the multiple storage nodes is the same as the number of the multiple logical space shards. A storage node corresponding to each logical space shard has read and write permissions to the logical space shard. In a case where the processor 60b schedules the multiple storage nodes to concurrently read data blocks corresponding to the multiple logical space shards in the original snapshot copy to the memories of the multiple storage nodes, the processor 60b is specifically configured to: for any logical space shard, schedule a first storage node corresponding to the any logical space shard to read a data block corresponding to the any logical space shard from the data file of the original snapshot copy into a memory of the first storage node.

Accordingly, in a case where the processor 60b schedules the multiple storage nodes to write the data blocks in the memories into the data file of the new snapshot copy, the processor 60b is specifically configured to: schedule the first storage node to write a data block in a memory of the first storage node into the data file of the new snapshot copy.

In other embodiments, there is at least one target logical space shard among the multiple logical space shards which is corresponding to at least two storage nodes. A designated storage node among the at least two storage nodes corresponding to the target logical space shard has write permission to the target logical space shard. In a case where the processor 60b schedules the multiple storage nodes to concurrently read data blocks corresponding to the multiple logical space shards in the original snapshot copy into memories of the multiple storage nodes, the processor 60b is specifically configured to: for the target logical space shard, schedule a second storage node corresponding to the target logical space shard to read a data block corresponding to the target logical space shard from the data file of the original snapshot copy into a memory of the second storage node.

Accordingly, in a case where the processor 60b schedules the multiple storage nodes to write the data blocks in the memories into the data file of the new snapshot copy, the processor 60b is specifically configured to: schedule the designated storage node to write the data block in the memory of the second storage node into the data file of the new snapshot copy.

Optionally, in a case where the processor 60b divides the logical address space of the original snapshot copy into multiple logical space shards, the processor 60b is specifically configured to: divide the logical address space of the original snapshot copy into multiple logical space shards according to the number of schedulable storage nodes and the amount of data of the original snapshot copy.

Optionally, the processor 60b is also configured to: before importing the physical file of the new snapshot copy into the cloud disk, mark a target logical block address in the index file of the cloud disk which points to the data file of the original snapshot copy as a designated identifier; and after importing the physical file of the new snapshot copy into the cloud disk, modify the target logical block address to physical address space that points to the data file of the new snapshot copy.

In some optional implementations, as shown in FIG. 16, the computing device may further include optional components such as a power supply component 60d. FIG. 16 only schematically shows some components, which does not mean that the computing device must include all the components shown in FIG. 16, nor does it mean that the computing device can only include the components shown in FIG. 16.

In a case where there are data access hotspots in the original snapshot copy, the computing device provided by the present embodiments may schedule multiple storage nodes to concurrently read the data files of the original snapshot copy into memories of the multiple storage nodes, which can improve the efficiency of the storage nodes in reading the data files of the original snapshot copy. Based on data files in the memories of the multiple storage nodes, data to be accessed is provided for the instance, and memory caches of multiple storage nodes may be used to accelerate the reading speed of the data to be accessed and reduce the data access delay. On the other hand, the multiple storage nodes are scheduled to dynamically generate a new snapshot copy based on the data files in the memories for a cloud disk to reference. In this way, in a case where an instance is started, the instance may access the new snapshot copy, and the access traffic to the data to be accessed may be dispersed to different snapshot copies, which can reduce the probability of data access hotspots and even eliminate data access hotspots, thereby helping to speed up data access efficiency and reduce data access latency.

In the embodiments of the present application, the memory is used to store a computer program and may be configured to store various other data to support operations on the device where it is located. The processor may execute the computer program stored in the memory to implement corresponding control logic. The memory may be implemented by any type of volatile or non-volatile storage devices or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic storage, a flash memory, a magnetic disk or an optical disk.

In the embodiments of the present application, the processor may be any hardware processing device that may perform the logic of the above method. Optionally, the processor may be a central processing unit (CPU), a graphics processing unit (GPU) or a microcontroller unit (MCU); it may also be a programmable device such as a field programmable gate array (FPGA), a programmable array logic device (PAL), a general array logic device (GAL), a complex programmable logic device (CPLD); or it may be an advanced RISC processor (Advanced RISC Machines, ARM) or a system on chip (SOC), etc., but is not limited thereto.

In the embodiments of the present application, the communication component is configured to facilitate wired or wireless communication between the device in which it is located and other devices. The device where the communication component is located may access a wireless network based on communication standards, such as Wi-Fi, 2G or 3G, 4G, 5G or a combination thereof. In one exemplary embodiment, the communication component receives a broadcast signal or broadcast-related information from an external broadcast management system via a broadcast channel. In one exemplary embodiment, the communication component may also be implemented based on near field communication (NFC) technology, radio frequency identification (RFID) technology, infrared data association (IrDA) technology, ultra-wideband (UWB) technology, Bluetooth (BT) technology or other technologies.

In the embodiments of the present application, the power supply component is configured to provide power to various components of the device in which it is located. The power supply assembly may include a power management system, one or more power supplies, and other components associated with generating, managing, and distributing power to the device in which the power supply assembly is located.

It should be noted that the descriptions such as "first" and "second" herein are used to distinguish different messages, devices, modules, etc., and do not represent the order of precedence, nor do they limit "first" and "second" to different types.

Those skilled in the art should understand that the embodiments of the present application may be provided as methods, systems, or computer program products. Therefore, the present application may take the form of an entirely hardware embodiment, an entirely software embodiment, or an embodiment combining software and hardware aspects. Moreover, the present application may take the form of computer program products implemented on one or more computer-usable storage media (including but not limited to disk storage, CD-ROM, optical storage, etc.) containing computer-usable program codes.

The present application is described with reference to flowcharts and/or block diagrams of methods, devices (systems), and computer program products according to the embodiments of the present application. It should be understood that each process and/or block in the flowchart and/or block diagram, and a combination of the processes and/or blocks in the flowchart and/or block diagram may be implemented by computer program instructions. These computer program instructions may be provided to a processor of a general-purpose computer, a special-purpose computer, an embedded processor or other programmable data processing device to produce a machine, so that the instructions executed by the processor of the computer or other programmable data processing device produce an apparatus for implementing the functions specified in one or more processes in the flowchart and/or one or more blocks in the block diagram.

These computer program instructions may also be stored in a computer-readable memory that may direct a computer or other programmable data processing devices to work in a specific manner, so that the instructions stored in the computer-readable memory produce a manufactured product including an instruction apparatus that implements the functions specified in one or more processes in the flowchart and/or one or more blocks in the block diagram.

These computer program instructions may also be loaded onto a computer or other programmable data processing devices so that a series of operational steps are performed on the computer or other programmable devices to produce a computer-implemented process, whereby the instructions executed on the computer or other programmable devices provide steps for implementing the functions specified in one or more processes in the flowchart and/or one or more blocks in the block diagram.

In one typical configuration, a computing device includes one or more processors (CPU), an input/output interface, a network interface, and a memory.

The memory may include following forms of a computer-readable medium: non- permanent storage, random access memory (RAM) and/or non-volatile memory, like read-only memory (ROM) or flash RAM. The memory is an example of a computer-readable medium.

The storage medium of a computer is a readable storage medium, which may also be called a readable medium. The readable storage medium includes permanent and non-permanent, removable and non-removable media that may implement information storage by any method or technology. The information may be computer-readable instructions, data structures, program modules or other data. Examples of the computer storage medium include, but are not limited to, phase change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disk-read-only memory (CD-ROM), digital versatile disk (DVD) or other optical storage, magnetic cassettes, magnetic disk storage or other magnetic storage devices, or any other non-transmission medium that may be used to store information that may be accessed by a computing device. According to the definition herein, the computer-readable medium does not include transitory media, such as modulated data signals and carrier waves.

It should also be noted that the terms "comprise", "include" or any other variations thereof are intended to cover non-exclusive inclusion, such that a process, method, commodity, or device that includes a series of elements includes not only those elements, but also other elements not explicitly listed, or also includes elements inherent to such process, method, commodity, or device. Without more constraints, an element defined by the phrase "comprising a . . . " does not exclude the existence of other identical elements in the process, method, product or device comprising the element.

The above descriptions are merely embodiments of the present application and are not intended to limit the present application. For those skilled in the art, various modifications and variations may be made to the present application. Any modifications, equivalent substitutions, improvements, etc. made within the spirit and principles of the present application should be encompassed in the scope of the claims of the present application.

What is claimed is:

1. A data access method, comprising:
   obtaining a data request initiated by an instance for accessing a cloud disk loaded to the instance;
   obtaining a snapshot identifier of data to be accessed from the data request;
   in a case where there is a data access hotspot in an original snapshot copy corresponding to the snapshot identifier, scheduling a plurality of storage nodes to concurrently read a data file of the original snapshot copy into memories of the plurality of storage nodes;
   providing the data to be accessed to the instance based on data files in the memories of the plurality of storage nodes;
   scheduling the plurality of storage nodes to generate a new snapshot copy corresponding to the snapshot identifier based on the data files in the memories; and
   importing a physical file of the new snapshot copy into the cloud disk for the instance to access the new snapshot copy.

2. The method as claimed in claim 1, wherein importing the physical file of the new snapshot copy into the cloud disk comprises:
   importing the physical file of the new snapshot copy into the cloud disk via a hard link method.

3. The method as claimed in claim 1, wherein scheduling the plurality of storage nodes to concurrently read the data file of the original snapshot copy into the memories of the multiple storage nodes comprises:
   obtaining logical address space of the original snapshot copy from an index file of the original snapshot copy;
   dividing the logical address space of the original snapshot copy into a plurality of logical space shards; and
   scheduling the plurality of storage nodes to concurrently read data blocks corresponding to the plurality of logical space shards from the original snapshot copy into the memories of the plurality of storage nodes.

4. The method as claimed in claim 3, wherein scheduling the plurality of storage nodes to concurrently read the data blocks corresponding to the plurality of logical space shards from the original snapshot copy into the memories of the plurality of storage nodes comprises:
   scheduling the plurality of storage nodes to concurrently read, in a delayed loading manner, the data blocks respectively corresponding to the plurality of logical space shards from the data file of the original snapshot copy into the memories of the plurality of storage nodes.

5. The method as claimed in claim 3, wherein scheduling the plurality of storage nodes to generate the new snapshot copy corresponding to the snapshot identifier based on the data files in the memories comprises:
   scheduling the plurality of storage nodes to concurrently write the data blocks in the memories into a data file of the new snapshot copy;
   establishing a correspondence between logical address space of the new snapshot copy and physical address space of the data file of the new snapshot copy; and
   writing the correspondence into an index file of the new snapshot copy to obtain the new snapshot copy.

6. The method as claimed in claim 5, wherein a number of the plurality of storage nodes is the same as a number of the plurality of logical space shards; a storage node corresponding to each logical space shard has read and write permissions to the corresponding logical space shard;
   wherein scheduling the plurality of storage nodes to concurrently read the data blocks corresponding to the plurality of logical space shards from the original snapshot copy into the memories of the plurality of storage nodes comprises:
   for any logical space shard, scheduling a first storage node corresponding to the any logical space shard to read a data block corresponding to the any logical space shard from the data file of the original snapshot copy into a memory of the first storage node;
   wherein scheduling the plurality of storage nodes to write the data blocks in the memories into the data file of the new snapshot copy comprises:
   scheduling the first storage node to write the data block in the memory of the first storage node into the data file of the new snapshot copy.

7. The method as claimed in claim 5, wherein there is at least one target logical space shard corresponding to at least two storage nodes among the plurality of logical space shards; a designated storage node among the at least two storage nodes corresponding to the target logical space shard has write permission to the target logical space shard;

wherein scheduling the plurality of storage nodes to concurrently read the data blocks corresponding to the plurality of logical space shards from the original snapshot copy into the memories of the plurality of storage nodes comprises:

for the target logical space shard, scheduling a second storage node corresponding to the target logical space shard to read a data block corresponding to the target logical space shard from the data file of the original snapshot copy into a memory of the second storage node;

wherein scheduling the plurality of storage nodes to write the data blocks in the memories into the data file of the new snapshot copy comprises:

scheduling the designated storage node to write the data block in the memory of the second storage node into the data file of the new snapshot copy.

8. The method as claimed in claim 5, wherein the method further comprises: before importing the physical file of the new snapshot copy into the cloud disk, marking a target logical block address, which points to the data file of the original snapshot copy, in an index file of the cloud disk as a designated identifier; and after importing the physical file of the new snapshot copy into the cloud disk, modifying the target logical block address to physical address space that points to the data file of the new snapshot copy.

9. The method as claimed in claim 3, wherein dividing the logical address space of the original snapshot copy into the plurality of logical space shards comprises:

dividing the logical address space of the original snapshot copy into the plurality of logical space shards according to a number of schedulable storage nodes and amount of data of the original snapshot copy.

10. The method according to claim 1, further comprising performing at least one of determination operations of:

obtaining data read time delay of a cloud disk that references the original snapshot copy; and determining whether the data read time delay is greater than or equal to a set time delay threshold;

obtaining a number of references to the original snapshot copy; and determining whether the number of references to the original snapshot copy is greater than or equal to a set threshold number of references; and if a determination result of the at least one of the determination operations is positive, determining that there is the data access hotspot in the original snapshot copy.

11. A non-transitory computer-readable storage medium having computer instructions stored thereon, which, when executed by one or more processors, cause the one or more processors to perform steps in the method as claimed in claim 1.

12. A distributed storage system, comprising: a virtualized service node, a management and control node, a block service node and a storage node; wherein the virtualized service node is deployed with an instance;
the block service node is provided with a cloud disk;
the storage node stores a snapshot copy required for the instance to start up;
the cloud disk in the block service node is loaded to the instance;
during startup, the instance sends a data request to the cloud disk;

the management and control node is configured to: obtain the data request; obtain a snapshot identifier of data to be accessed from the data request; in a case where there is a data access hotspot in an original snapshot copy corresponding to the snapshot identifier, schedule a plurality of storage nodes to concurrently read a data file of the original snapshot copy into memories of the plurality of storage nodes; the instance reads the data to be accessed from the memories of the plurality of storage nodes;

the management and control node is further configured to schedule the plurality of storage nodes to generate a new snapshot copy corresponding to the snapshot identifier based on the data files in the memories, for the instance to access the new snapshot copy.

13. A computing device, comprising: a memory, a processor and a communication component; wherein the memory is configured to store a computer program;

the processor is coupled to the memory and the communication component, and configured to execute the computer program to perform operations of:

obtaining a data request initiated by an instance for accessing a cloud disk loaded to the instance;

obtaining a snapshot identifier of data to be accessed from the data request;

in a case where there is a data access hotspot in an original snapshot copy corresponding to the snapshot identifier, scheduling a plurality of storage nodes to concurrently read a data file of the original snapshot copy into memories of the plurality of storage nodes;

providing the data to be accessed to the instance based on data files in the memories of the plurality of storage nodes;

scheduling the plurality of storage nodes to generate a new snapshot copy corresponding to the snapshot identifier based on the data files in the memories; and importing a physical file of the new snapshot copy into the cloud disk for the instance to access the new snapshot copy.

14. The computing device as claimed in claim 13, wherein the processor is configured to execute the computer program to perform operations of:

importing the physical file of the new snapshot copy into the cloud disk via a hard link method.

15. The computing device as claimed in claim 13, wherein the processor is configured to execute the computer program to perform operations of:

obtaining logical address space of the original snapshot copy from an index file of the original snapshot copy;

dividing the logical address space of the original snapshot copy into a plurality of logical space shards; and scheduling the plurality of storage nodes to concurrently read data blocks corresponding to the plurality of logical space shards from the original snapshot copy into the memories of the plurality of storage nodes.

16. The computing device as claimed in claim 15, wherein the processor is configured to execute the computer program to perform operations of:

scheduling the plurality of storage nodes to concurrently read, in a delayed loading manner, the data blocks respectively corresponding to the plurality of logical space shards from the data file of the original snapshot copy into the memories of the plurality of storage nodes.

17. The computing device as claimed in claim 15, wherein the processor is configured to execute the computer program to perform operations of:

scheduling the plurality of storage nodes to concurrently write the data blocks in the memories into a data file of the new snapshot copy;

establishing a correspondence between logical address space of the new snapshot copy and physical address space of the data file of the new snapshot copy; and writing the correspondence into an index file of the new snapshot copy to obtain the new snapshot copy.

18. The computing device as claimed in claim 17, wherein a number of the plurality of storage nodes is the same as a number of the plurality of logical space shards; a storage node corresponding to each logical space shard has read and write permissions to the corresponding logical space shard;

wherein the processor is configured to execute the computer program to perform operations of:

for any logical space shard, scheduling a first storage node corresponding to the any logical space shard to read a data block corresponding to the any logical space shard from the data file of the original snapshot copy into a memory of the first storage node;

scheduling the first storage node to write the data block in the memory of the first storage node into the data file of the new snapshot copy.

19. The computing device as claimed in claim 17, wherein there is at least one target logical space shard corresponding to at least two storage nodes among the plurality of logical space shards; a designated storage node among the at least two storage nodes corresponding to the target logical space shard has write permission to the target logical space shard;

wherein the processor is configured to execute the computer program to perform operations of:

for the target logical space shard, scheduling a second storage node corresponding to the target logical space shard to read a data block corresponding to the target logical space shard from the data file of the original snapshot copy into a memory of the second storage node;

scheduling the designated storage node to write the data block in the memory of the second storage node into the data file of the new snapshot copy.

20. The computing device as claimed in claim 15, wherein the processor is configured to execute the computer program to perform operations of:

dividing the logical address space of the original snapshot copy into the plurality of logical space shards according to a number of schedulable storage nodes and amount of data of the original snapshot copy.

* * * * *